(12) United States Patent
Atasu et al.

(10) Patent No.: US 11,042,604 B2
(45) Date of Patent: Jun. 22, 2021

(54) ASSESSING DISTANCES BETWEEN PAIRS OF HISTOGRAMS BASED ON RELAXED FLOW CONSTRAINTS

(71) Applicant: International Business Machines Corporation, Armonk, NY (US)

(72) Inventors: Kubilay Atasu, Rueschlikon (CH); Thomas Mittelholzer, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 283 days.

(21) Appl. No.: 16/208,990

(22) Filed: Dec. 4, 2018

(65) Prior Publication Data

US 2020/0175092 A1 Jun. 4, 2020

(51) Int. Cl.
*G06F 17/18* (2006.01)
*G06F 17/16* (2006.01)

(52) U.S. Cl.
CPC .............. *G06F 17/18* (2013.01); *G06F 17/16* (2013.01)

(58) Field of Classification Search
CPC ................. G06F 17/16; G06F 17/18
(Continued)

(56) References Cited

U.S. PATENT DOCUMENTS 9,129,189 B2 9/2015 Hamsici
9,710,492 B2 7/2017 Grzeszczuk et al.
(Continued)

OTHER PUBLICATIONS

K. Atasu et al., "Linear-complexity relaxed word Mover's distance with GPU acceleration," 2017 IEEE International Conference on Big Data (Big Data), 2017, pp. 889-896 (Year: 2017).*
(Continued)

*Primary Examiner* — Matthew D Sandifer
(74) *Attorney, Agent, or Firm* — Harrington & Smith

(57) ABSTRACT

The example embodiments of the invention notably are directed to a computer-implemented method for assessing distances between pairs of histograms. Each of the histograms is a representation of a digital object; said representation comprises bins associating weights to respective vectors. Such vectors represent respective features of said digital object. This method basically revolves around computing distances between pairs of histograms. That is, for each pair {p, q} of histograms p and q of said pairs of histograms, the method computes a distance between p and q of said each pair {p, q}. In more detail, said distance is computed according to a cost of moving p into q, so as to obtain a flow matrix F, whose matrix elements $F_{i,j}$ indicate, for each pair {i,j} of bins of p and q, how much weight of a bin i of p has to flow to a bin j of q to move p into q. This is achieved by minimizing a quantity $\Sigma_{i,j} F_{i,j} \cdot C_{i,j}$, where $C_{i,j}$ is a matrix element of a cost matrix C representing said cost. Said quantity $\Sigma_{i,j} F_{i,j} \cdot C_{i,j}$ is minimized under two flow constraints, which, interestingly, include a relaxed flow constraint $F_{i,j} \leq r_{i,j}$, in addition to a complementary flow constraint. The relaxed flow constraint $F_{i,j} \leq r_{i,j}$ is applied for at least some of the pairs {i,j}, with $r_{i,j}$ equal to $p_i$ or $q_j$, where $p_i$ and $q_j$ are weights associated to bins i and j of p and q, respectively, and the complementary flow constraint is either an out-flow constraint $\Sigma_j F_{i,j} = p_i$ if $r_{i,j} = q_j$ or an in-flow constraint $\Sigma_i F_{i,j} = q_j$ if $r_{i,j} = p_i$. The invention is further directed to related computer program products.

19 Claims, 8 Drawing Sheets

(58) Field of Classification Search
USPC .......................................................... 702/180
See application file for complete search history.

(56) References Cited

U.S. PATENT DOCUMENTS

| | | |
|---|---|---|
| 2011/0246939 A1 | 10/2011 | Kasahara et al. |
| 2016/0275370 A1 | 9/2016 | Yang et al. |
| 2017/0255840 A1 | 9/2017 | Jean et al. |
| 2019/0278850 A1* | 9/2019 | Atasu .................... G06F 40/237 |

OTHER PUBLICATIONS

Atasu, K., et al., "Linear-complexity relaxed word mover's distance with GPU acceleration", IEEE International Conference on Big Data, 2017, pp. 889-896.

Kusner, et al., "From word embeddings to document distances", In Bach, F., and Blei, D., eds., Proceedings of the 32nd International Conference on Machine Learning, vol. 37 of Proceedings of Machine Learning Research, 2015, pp. 957-966. Lille, France: PMLR.

Levina, E., et al., "The Earth Mover's distance is the Mallows distance: some insights from statistics", In Proceedings Eighth IEEE International Conference on Computer Vision, ICCV 2001, vol. 2, pp. 251-256.

Mikolov, T., et al., "Efficient estimation of word representations in vector space", CoRR abs/1301.3781, 2013, whole document.

Pele, O., et al., "Fast and robust earth mover's distances", In 2009 IEEE 12th International Conference on Computer Vision, 2009, pp. 460-467.

Rubner, Y., et al., "A metric for distributions with applications to image databases", In Proceedings of the Sixth International Conference on Computer Vision, ICCV '98, 1998, pp. 59-66. Washington, DC, USA: IEEE Computer Society.

Shirdhonkar, S., et al., "Approximate earth movers distance in linear time", In 2008 IEEE Conference on Computer Vision and Pattern Recognition, 2008, pp. 1-8.

Martinez, M., et al., "Relaxed Earth Mover's Distances for Chain- and Tree-connected Spaces and their use as a Loss Function in Deep Learning", Nov. 2016, whole document (9 pgs.).

* cited by examiner

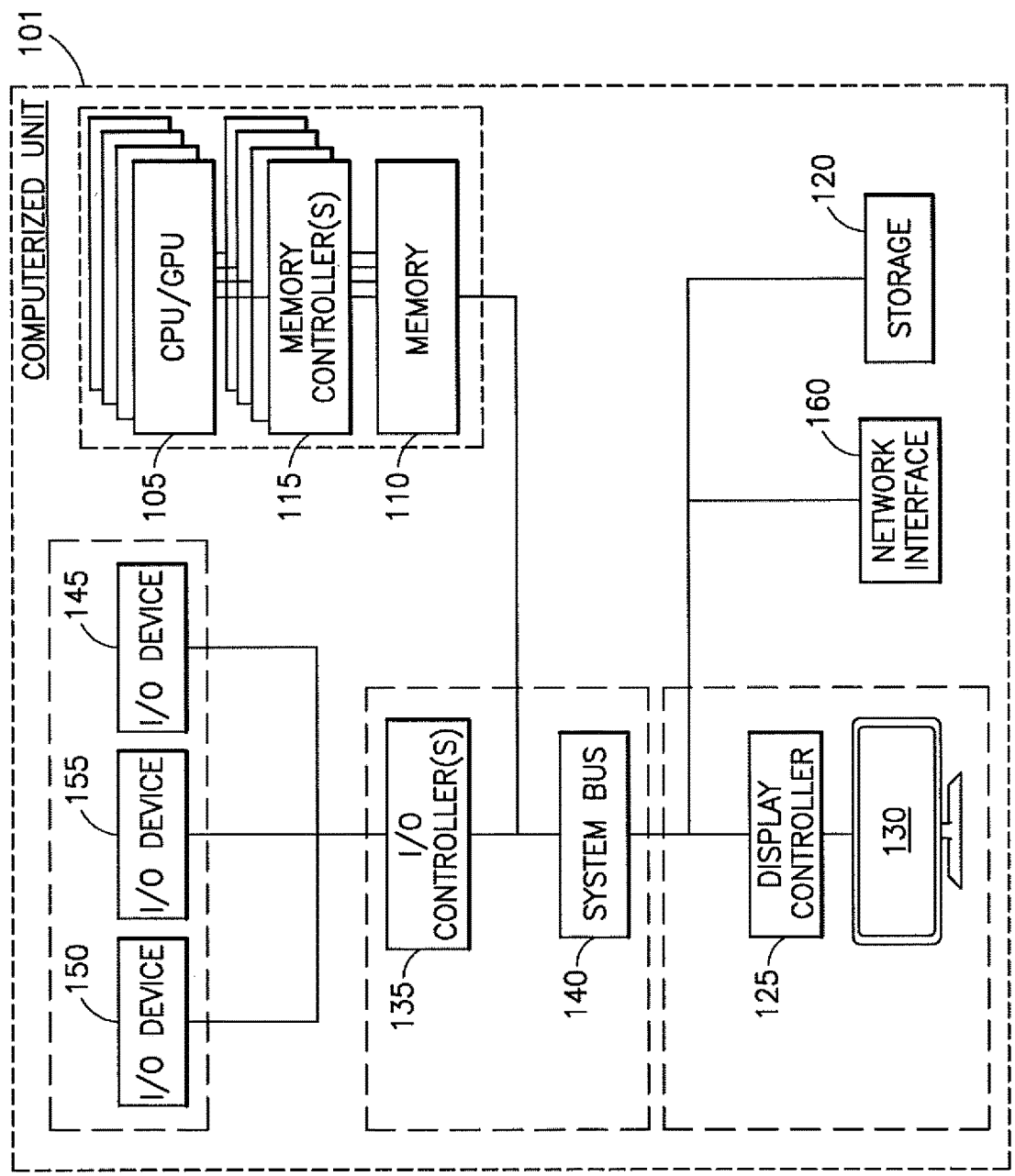

ASSESSING DISTANCES BETWEEN PAIRS OF HISTOGRAMS BASED ON RELAXED FLOW CONSTRAINTS

BACKGROUND

The invention relates in general to the field of Wasserstein-based methods for assessing distances between pairs of histograms, such as the Earth Mover's Distance (EMD) and the Word Mover's Distance (WMD) and Relaxed Word Mover's Distance (RWMD), as well as related computer program products.

The EMD algorithm was initially proposed in the image processing field to measure the distance between color histograms (Rubner, Tomasi, and Guibas 1998). In optimization theory, a more general formulation of EMD, called the Wasserstein distance, has been used extensively (Villani 2003) to measure the distance between probability distributions. In statistics, an equivalent distance measure is known as the Mallows distance (Levina and Bickel 2001).

In the text domain, an adaptation of EMD, called Word Movers distance, has emerged as a semantic similarity metric (Kusner et al. 2015). WMD captures semantic similarity by using the concept of word embeddings in the computation of EMD. Word embeddings map words into a high-dimensional vector space such that the words that are semantically similar are close to each other. These vectors can be pre-trained in an unsupervised way, e.g., by running Google's Word2vec algorithm (Mikolov et al. 2013) on publicly available data sets. Given two sentences that cover the same topic but have no words in common, traditional methods (such as cosine similarity) fail to detect the similarity, whereas WMD detects and quantifies the similarity by taking the proximity between different words into account.

What makes Wasserstein-based approaches (such as EMD) attractive is their high accuracy. Yet, such an accuracy does not come for free. In general, the time complexity of computing these measures grows cubically in the size of the probability distributions. Such a high complexity renders their use impractical for large data sets. Therefore, there is a growing need for low-complexity approximation methods.

A linear complexity approximation algorithm for computing EMD in low-dimensional vector spaces was proposed (Shirdhonkar and Jacobs 2008). The algorithm has linear complexity in the size of the inputs. However, its complexity grows exponentially with the dimensionality of the underlying vector space. In practice, the method becomes intractable if the dimensionality of the vector space is larger than three. For instance, it is not applicable to WMD because the dimensionality of the word embedding vectors is typically on the order of several hundred when using WMD.

A linear-complexity algorithm for computing approximate EMD distances over multi-dimensional vector spaces has also been proposed (Atasu et al. 2017). The algorithm, called Linear-Complexity Relaxed Word Mover's Distance (LC-RWMD), achieves up to four orders of magnitude improvement in speed with respect to WMD. In addition, on highly curated and compact text documents, it computes high-quality results that are close to those found by WMD. Still, and despite its scalability, the implementation of LC-RWMD such as proposed in the paper by Atasu et al. may not always be applicable (e.g., to dense histograms) and its accuracy decreases when comparing probability distributions with many overlapping coordinates.

The following references illustrate the background art:
Atasu, K.; Parnell, T. P.; Dunner, C.; Sifalakis, M.; Pozidis, "H.; Vasileiadis, V.; Vlachos, M.; Berrospi, C.; and Labbi, A. 2017. Linear-complexity relaxed word mover's distance with GPU acceleration. In 2017 *IEEE International Conference on Big Data, BigData* 2017, Boston, Mass., USA, Dec. 11-14, 2017, 889-896.
Kusner, M.; Sun, Y.; Kolkin, N.; and Weinberger, K. 2015. From word embeddings to document distances. In Bach, F., and Blei, D., eds., *Proceedings of the 32nd International Conference on Machine Learning*, volume 37 of *Proceedings of Machine Learning Research*, 957-966. Lille, France: PMLR.
Levina, E., and Bickel, P. 2001. The Earth Mover's distance is the Mallows distance: some insights from statistics. In *Proceedings Eighth IEEE International Conference on Computer Vision. ICCV* 2001, volume 2, 251-256.
Mikolov, T.; Chen, K.; Corrado, G.; and Dean, J. 2013. Efficient estimation of word representations in vector space. *CoRR* abs/1301.3781.
Pele, O., and Werman, M. 2009. Fast and robust earth mover's distances. In 2009 *IEEE 12th International Conference on Computer Vision*, 460-467.
Rubner, Y.; Tomasi, C.; and Guibas, L. J. 1998. A metric for distributions with applications to image databases. In *Proceedings of the Sixth International Conference on Computer Vision*, ICCV '98, 59-66. Washington, D.C., USA: IEEE Computer Society.
Shirdhonkar, S., and Jacobs, D. W. 2008. Approximate earth movers distance in linear time. In 2008 *IEEE Conference on Computer Vision and Pattern Recognition*, 1-8.

SUMMARY

According to a first aspect, example embodiments of the invention as described herein can be performed as a computer-implemented method for assessing distances between pairs of histograms. Each of the histograms is a representation of a digital object; said representation comprises bins associating weights to respective vectors. Such vectors represent respective features of said digital object. This method basically revolves around computing distances between pairs of histograms. That is, for each pair {p, q} of histograms p and q of said pairs of histograms, the method computes a distance between p and q of said each pair {p, q}.

In more detail, said distance is computed according to a cost of moving p into q, so as to obtain a flow matrix F, whose matrix elements $F_{i,j}$ indicate, for each pair {i,j} of bins of p and q, how much weight of a bin i of p has to flow to a bin j of q to move p into q. This is achieved by minimizing a quantity $\Sigma_{i,j} F_{i,j} \cdot C_{i,j}$, where $C_{i,j}$ is a matrix element of a cost matrix C representing said cost. Said quantity $\Sigma_{i,j} F_{i,j} \cdot C_{i,j}$ is minimized under two flow constraints, which, interestingly, include a relaxed flow constraint $F_{i,j} \leq r_{i,j}$, in addition to a complementary flow constraint. The relaxed flow constraint $F_{i,j} \leq r_{i,j}$ is applied for at least some of the pairs {i,j}, with $r_{i,j}$ equal to $p_i$ or $q_j$, where $p_i$ and $q_j$ are weights associated to bins i and j of p and q, respectively, and the complementary flow constraint is either an out-flow constraint $\Sigma_{i,j} F_{i,j} = p_i$ if $r_{i,j} = q_j$ or an in-flow constraint $\Sigma_{i,j} F_{i,j} = q_j$ if $r_{i,j} = p_i$.

Here, histograms estimate a probability distribution pertaining to a variable captured as vector coordinates. More precisely, each histogram associates, for each bin, a weight (such weights are also referred to as "mass") to a particular vector of a multi-dimensional vector space, wherein each vector represents a feature of a digital object. Thus, a histogram aggregates features of a respective digital object, to which it associates respective weights. For example, a histogram can be derived from a text document, so as to store the weights (e.g., term frequencies, or raw counts) of words (e.g., unique words) in that document, where words can be captured as vectors, e.g., using text representations based on neural networks, such as the popular "word2vec" representation.

The algorithm word2vec capitalizes on neural networks to map words onto an appropriate vector space. In this embedding space, words that are semantically related will be close to each other. Other word embedding schemes can be contemplated, as the skilled person will appreciate. More generally, a histogram may capture any digital object. Beyond a text document, such a digital object may for example be a database, an image, an audio file, a video, etc.

Transforming a first histogram into a second one involves moving weights from the bins of the first histogram into the bins of the second, thereby constructing the second histogram from the first. The goal is to minimize the total distance travelled: the pairwise transportation costs between different histogram bins are computed based on their respective coordinates. The resulting distances can thus be stored in a cost matrix C.

Two flow constraints are usually utilized to compute the distance between p and q. Interestingly here, such constraints include a relaxed flow constraint $F_{i,j} \leq r_{i,j}$, which is applied for at least some of the pairs $\{i,j\}$. The relaxed constraint is used in combination with a complementary (non-relaxed) constraint, i.e., the so-called out-flow constraint $\Sigma_j F_{i,j}=p_i$ (if $r_{i,j}=q_j$) or the so-called in-flow constraint $\Sigma_i F_{i,j}=q_j$ (if $r_{i,j}=p_i$). In typical implementations, such out/in-flow constraints are normally applied for all i or all j.

In other words, the method either imposes $\Sigma_j F_{i,j}=p_i$ (possibly for all i) or $\Sigma_i F_{i,j}=q_j$ (possibly for all j). In the former case, the method further imposes a relaxed in-flow constraint $F_{i,j} \leq q_j$, for at least some of the $\{i,j\}$ pairs. In the latter case, the method further imposes a relaxed out-flow constraint $F_{i,j} \leq p_i$ between at least some of the $\{i,j\}$ pairs. Note, imposing a relaxed constraint $F_{i,j} \leq p_i$ or $F_{i,j} \leq q_j$ amounts to relaxing either one of the usual in-flow and out-flow constraint when minimizing the quantity $\Sigma_{i,j} F_{i,j} \cdot C_{i,j}$, whence the name of "relaxed constraint" adopted here.

Owing to the complementary constraint applied, the relaxed constraint that effectively results may be written as $F_{i,j} \leq \min(p_i, q_j)$. This is due to the fact that the relaxed constraint actually applied is always used in combination with its complementary (non-relaxed) constraint.

In prior methods, the cost of moving p into q is minimized under one or each of the out-flow constraint $\Sigma_j F_{i,j}=p_i$ and the in-flow constraint $\Sigma_i F_{i,j}=q_j$. In the present case, however, the cost is minimized under a relaxed flow constraint, e.g., $F_{i,j} \leq q_j$ (for at least some of the $\{i,j\}$ pairs) and the complementary (non-relaxed) constraint, which has huge benefits in terms of the quality of the solutions, but has a minimal impact on the computational cost. Still, implementations can be contemplated, which have no impact on the accuracy of the results, as discussed below.

Note, the above conditions may possibly be reformulated according to a network flow problem, in terms of edge capacities and edge costs. Namely, using terminologies as in network flow algorithms, the bins i of p can be regarded as source nodes, while the bins j of q are the sink nodes. Each source node i is connected to a sink node j through an edge. With such notations, $C_{i,j}$ is the cost incurred by transporting one unit through the edge connecting i to j, i.e., between bin i of p and bin j of q. $C_{i,j}$ is computed based on the vector coordinates associated to p and q, it being reminded that bin i of a histogram p also includes vector coordinates, in addition to its associated weight $p_i$.

Several examples of algorithms are discussed in detail in the following, these including a so-called Overlapping Mass Reduction (OMR) algorithm, an Iterative Constrained Transfers (ICT) algorithm, as well as an approximate solution to the ICT algorithm (hereafter AICT). Several variants to these algorithms are furthermore evoked. All such algorithms assume that histograms are normalized, for simplicity, i.e., $\Sigma_i p_i=\Sigma_i q_i=1$. The OMR algorithm imposes the relaxed constraint only between overlapping pairs of coordinates, while the ICT algorithm imposes it between all pairs of coordinates. The AICT algorithm mixes aspects of both the OMR and the ICT algorithms.

Now, irrespective of the actual algorithm applied, said distance is preferably computed twice, i.e., one time by imposing the out-flow constraint $\Sigma_j F_{i,j}=p_i$, for all i (while otherwise imposing the relaxed, in-flow constraint $F_{i,j} \leq q_j$) and another time by imposing the in-flow constraint $\Sigma_i F_{i,j}=q_j$, for all j (while otherwise imposing the relaxed, out-flow constraint $F_{i,j} \leq p_i$).

This means that, for example, $r_{i,j}$ can possibly be the same for all pairs $\{i,j\}$, while the method is performed twice, e.g., a first time using $r_{i,j}=q_j$, and a second time using $r_{i,j}=p_i$. I.e., a first time by imposing $F_{i,j} \leq q_j$ for all pairs $\{i,j\}$ and then a second time using $F_{i,j} \leq p_i$ as a relaxed constraint (again for all pairs $\{i,j\}$), so as to achieve a more accurate lower bound. In embodiments, however, the relaxed constraint (which amounts to $F_{i,j} \leq \min(p_i, q_j)$) is applied for only some of the pairs $\{i,j\}$.

As said, using the relaxed constraint $F_{i,j} \leq \min(p_i, q_j)$ amounts to relaxing either one of the usual in-flow and out-flow constraint but this may possibly be performed in a different fashion for each pair $\{i,j\}$. That is, the quantity $\Sigma_{i,j} F_{i,j} \cdot C_{i,j}$ may possibly be minimized subject to both $F_{i,j} \leq \min(p_i, q_j)$ and a complementary constraint, the latter suitably selected according to the relaxed constraint effectively applied for each pair $\{i,j\}$.

Note, the modified formulation ($F_{i,j} \leq \min(p_i, q_j)$) of the relaxed constraint is implied by the complementary constraint. I.e., $F_{i,j} \leq p_i$ follows from $\Sigma_j F_{i,j}=p_i$, and similarly $F_{i,j} \leq q_j$ follows from $\Sigma_i F_{i,j}=q_j$. For example, considering $F_{i,j} \leq q_j$ and $\Sigma_j F_{i,j}=p_i$ implies that $F_{i,j} \leq \min(p_i, q_j)$. This is because $\Sigma_j F_{i,j}=p_i$ implies $F_{i,j} \leq p_i$. If $F_{i,j} \leq p_i$ and $F_{i,j} \leq q_j$, then $F_{i,j} \leq \min(p_i, q_j)$ is verified.

The relaxed constraint $F_{i,j} \leq \min(p_i, q_j)$ imposes capacity constraints on the edges of the flow network. One may for instance simply define $U_{i,j}=\min(p_i, q_j)$, where $U_{i,j}$ represents the capacity of the edge connecting bin i of p to bin j of q. Thus, the relaxed constraint $F_{i,j} \leq \min(p_i, q_j)$, under which the minimization is performed, makes sure that the flow $F_{i,j}$ (i.e., the amount transferred between i and j) is smaller than the capacity of the edge: $F_{i,j} \leq U_{i,j}$.

In preferred embodiments (such as relating to the OMR algorithm), the relaxed constraint $F_{i,j} \leq r_{i,j}$ is only applied where $C_{i,j}=0$. I.e., this amounts to imposing the relaxed constraint on pair $\{i,j\}$ only if $C_{i,j}=0$, that is, where the vector coordinates of i and j are the same, such that the distance between them is zero. In other words, $C_{i,j}=0$ implies that the i-th vector of p overlaps with the j-th vector of q.

Next, the computation of said distance shall preferably comprise, where $C_{i,j}=0$, removing the weight corresponding to one of bin i of p and bin j of q, depending on whether the relaxed constraint $F_{i,j} \leq p_i$ or $F_{i,j} \leq q_j$ is applied, respectively. This is referred to as a reduction step, whereby some of the weights (e.g., of the source histogram) are removed in the presence of overlaps, as exemplified in the detailed description.

Advantageously, the distance computation may (in OMR-like algorithms) only require computing the two smallest values in each row or column of C (depending on whether the relaxed constraint $F_{i,j} \leq p_i$ or $F_{i,j} \leq q_j$ is applied, respectively). Accordingly, in embodiments, the cost of moving weights from p to q (as allowed under both the relaxed constraint and the complementary constraint applied) may be evaluated according to the two smallest values computed.

In more detail, the evaluation of the cost of moving weights from p to q may further comprise: (i) if the matrix element $C_{i,j}$ corresponding the smallest of said two smallest values is equal to zero, evaluating a first amount of transfer from a corresponding bin i of p to a corresponding bin j of q, as allowed under the relaxed constraint and the complementary constraint applied; and (ii) then, evaluating a second amount of transfer from p to q corresponding to a second smallest value of said two smallest values, as allowed under the complementary constraint. Note, the maximal amount of transfer possible for the first amount corresponds to min $(p_t, q_j)$.

In other embodiments (such as relating to ICR-like algorithms), the quantity $\Sigma_{i,j} F_{i,j} \cdot C_{i,j}$ is minimized under a relaxed flow constraint applied for all of the pairs {i,j}. Yet, in this case too, the relaxed flow constraint effectively applied amounts to $F_{i,j} \leq \min(p_i, q_j)$, for the same reasons as given above.

In such embodiments, the distance computation may advantageously be performed by sorting, for each pair {i,j}, columns or rows of C in an ascending order. That is, if the relaxed flow constraint applied is $F_{i,j} \leq q_j$, then rows of C are sorted for each i. Conversely, columns of C are sorted for each j if the relaxed constraint applied is $F_{i,j} \leq p_i$. Accordingly, the cost of moving weights from p to q (as allowed under the relaxed constraint and the complementary constraint applied) is evaluated according to the sorted columns or rows of C. Note, it may be sufficient to compute and sort the top-k results, depending on whether iterations are interrupted or not, as discussed below.

In particular, this may be achieved by sorting, where the relaxed flow constraint is $F_{i,j} \leq q_j$, the i-th row $C_{i, [1 \ldots n_q]}$ of C, for each i, to create a list $s_p$ such that $C_{i, s_p[l]} \leq C_{i, s_p[l+1]}$ for $l \in \{1, \ldots, n_q - 1\}$. Here, $C_{i, s_p[l]}$ denotes the l-th smallest distance between bin i of p and bins $s_p[l]$ of q. Conversely, where the relaxed constraint is $F_{i,j} \leq p_i$, the j-th column $C_{[1, \ldots n_p], j}$ of C is sorted, for each j, to create a list $s_q$ such that $C_{s_q[l], j} \leq C_{s_q[l+1], j}$ for $l \in \{1, \ldots, n_p - 1\}$, where $C_{s_q[l], j}$ denotes the l-th smallest distance between bin j of q and bins $s_q[l]$ in p.

Evaluating the cost of moving weights from p to q shall preferably be performed as an iterative process, whereby $F_{i,j}$ elements are iteratively evaluated based on the relaxed flow constraint and the complementary flow constraint. In that case, contributions of $F_{i,j}$ elements to a cumulative transportation cost can be evaluated by multiplying $F_{i,j}$ elements with $C_{i, s_{p/q}[l]}$ elements obtained from said lists $s_p$ and $s_q$.

Note, although the above considerations primarily relate to ICR-like algorithms, similar considerations may apply to both the OMR and AICT algorithms, as discussed in the detailed description.

Interestingly, ICR-like algorithms can be simplified (hence yielding so-called AICT-like methods) by interrupting the above iterative process upon completing an iteration thereof, i.e., before having evaluated the cost of moving all weights from p to q. There, the evaluation of the cost of moving remaining weights from p to q (similar to the second amount of transfer from p to q, as discussed earlier) can be resumed based on a different algorithm, e.g., an algorithm that differs from said iterative process in complexity. The algorithm based on which the process is resumed may for instance be an adapted version of the so-called RWMD algorithm, as discussed in the detailed description. A similar simplification can be contemplated in the context of OMR-like algorithms.

In fact, the iterative process may possibly be terminated upon completing a single iteration, which already provides satisfactory results. More generally, however, the process may be continued for two or more iterations, this number being selected based on a target complexity of the method. In general, increasing iterations will increase the accuracy. However, improvements achieved after the second or third iteration may only be marginal in practice, as discussed in detail in the next section.

Note, when moving weights from p to q, the method may, in embodiments, be applied independently for each bin i of p and thus be parallelized. Then, for each i, the maximum number of iterations that can be performed is given by the dimensionality of q. When moving weights from q to p a similar method can be applied independently on each j of q (which can again be parallelized). Then, the maximum number of iterations that can be performed is given by the dimensionality of p.

As another remark, only the top-k closest values may need be computed in each row or column of C, e.g., based on a selected parameter k, which determines the number of iterations performed.

Of tremendous advantage is that the present methods may possibly be implemented so as to have a linear average time complexity. In practice, such methods may typically be applied to compare query histograms to a set of database histograms. Reducing the time complexity of such methods (e.g., from quadratic to linear) further makes it possible to compute pairwise distances across: (i) large sets of documents (e.g., millions of documents); and (ii) large histograms (e.g., millions of entries in histograms). And as embodiments disclosed herein happen to map well onto linear algebra primitives supported by modern GPU programming infrastructures, they effectively require a limited amount of working memory. Thus, they are very suitable for hardware acceleration.

In particularly preferred embodiments, AICT-like methods comprise three phases, each having a linear average time complexity. That is, given a query histogram q and a parameter k determining a number of iterations to be performed in said iterative process, such methods may decompose as follows.

During the first phase, and for each vector in a vocabulary V of vectors of histograms p of a database of histograms, top-k closest vectors in q are first determined;

Next, during the second phase, for each histogram p of the database, matrix elements $F_{i, s_i[l]}$ are obtained, which indicate, each, how much weight of a bin i of p has to flow to a bin $s_i[l]$ of q to move p into q. Here, $s_i[l]$ corresponds to the l-th closest vector in q to a vector of bin i of p. Such matrix elements are obtained by minimizing the quantity $\Sigma_{i,l} F_{i, s_i[l]} \cdot C_{i, s_i[l]}$ under both the relaxed flow constraint and the complementary flow constraint, where the summation $\Sigma_{i,l}$ is performed for l varying from 1 to k−1, such that k−1 iterations of said iterative process are performed; and During the third phase, matrix elements $F_{i, s_i[k]}$ are obtained, which indicate, each, how remaining weights of p have to flow to a k-th closest vector in q. Here, no relaxed flow constraint is applied anymore, as explained earlier.

In particular, the top-k closest vectors in q may be determined as follows. First, a dense matrix-matrix multiplication is performed between a v×m matrix V and a transpose of a h×m matrix Q. This way, a v×h distance matrix D is obtained. The matrix V stores information from the vocabulary V, m is a dimension of the vectors in V, v is a size of V, and Q stores information from the query histogram q of size h. Second, a row-wise reduction is performed, whereby the top-k closest vectors are computed in each row of D and stored on a v×k matrix Z, whereas indices of q that are associated with the top-k closest vectors computed are stored on a v×k matrix S. Then, a v×k matrix W matrix can be constructed, which stores corresponding weights of q, wherein $W_{i,l} = q_{s_i[l]}$ for i=1, . . . , v and l= 1, . . . , k.

Then, during the second phase, the matrices Z and W are used to transport a largest possible weight of p, this transportation being, by virtue of W, constrained to a smallest possible cost as given by Z, and the database histograms can be iteratively split into matrices $X^{(l)}$ and $Y^{(l)}$ based on W, where $Y^{(l)}$ indicates weights transported from the database histograms p to the query histogram q at iteration l, and $X^{(l)}$ indicates weights remaining in the database histograms after l iterations, whereby a cost of transporting $Y^{(l)}$ to a histogram q is computed as $Y^{(l)} \cdot z^{(l)}$, where $z^{(l)}$ is the l-th column of Z.

Finally, during the third phase (and upon completion of k−1 iterations), the cost of transporting the remaining weights from p to q can simply be determined by multiplying $X^{(k-1)}$ by $z^{(k)}$.

Note, X typically stores the weights of database histograms in a sparse matrix format. That is, each row of X stores a vector p of one database histogram. After k−1 iterations, it is possible that one or more weights (i.e., $p_i$ values) are nonzero in one or more of the database histograms. These represent the mass that remains in the database histograms after k−1 mass transfers between the database and q. Now, this remaining mass can be transferred to q during the third phase, without imposing the relaxed constraint between the bins i with nonzero weights and their respective k-th closest bins in q anymore.

In embodiments discussed herein, each matrix element $C_{i,j}$ may possibly be computed on-the-fly, upon minimizing said quantity $\Sigma_{i,j} F_{i,j} \cdot C_{i,j}$. Now, and as exemplified above, the matrix C is preferably computed via an auxiliary distance matrix, e.g., a v×h distance matrix D, in order to avoid wasteful computation of identical distances between same pairs of words in several matrices C.

Finally, as evoked earlier, the present distance computation steps are preferably implemented using linear algebra primitives of general-purpose computing on one or more graphics processing units of a computer system. Such steps may for example be distributed across a cluster of graphics processing units.

According to another aspect, the invention is embodied as a computer program product for assessing distances between pairs of histograms, consistently with the methods discussed above. That is, the computer program product comprises a computer readable storage medium having program instructions embodied therewith, where the program instructions are executable by one or more processors, to cause the latter to take steps according to the present methods.

Computerized methods and computer program products for performing example embodiments of the invention will now be described, by way of non-limiting examples, and in reference to the accompanying drawings.

BRIEF DESCRIPTION OF SEVERAL VIEWS OF THE DRAWINGS

The accompanying figures, where like reference numerals refer to identical or functionally similar elements throughout the separate views, and which together with the detailed description below are incorporated in and form part of the present specification, serve to further illustrate various embodiments and to explain various principles and advantages all in accordance with the present disclosure, in which:

FIG. 8 schematically represents a general purpose computerized system, suited for implementing method steps involved in embodiments and for parallelizing one or more of such steps, as in embodiments of the invention.

DETAILED DESCRIPTION OF EMBODIMENTS OF THE INVENTION

Figure 1B:
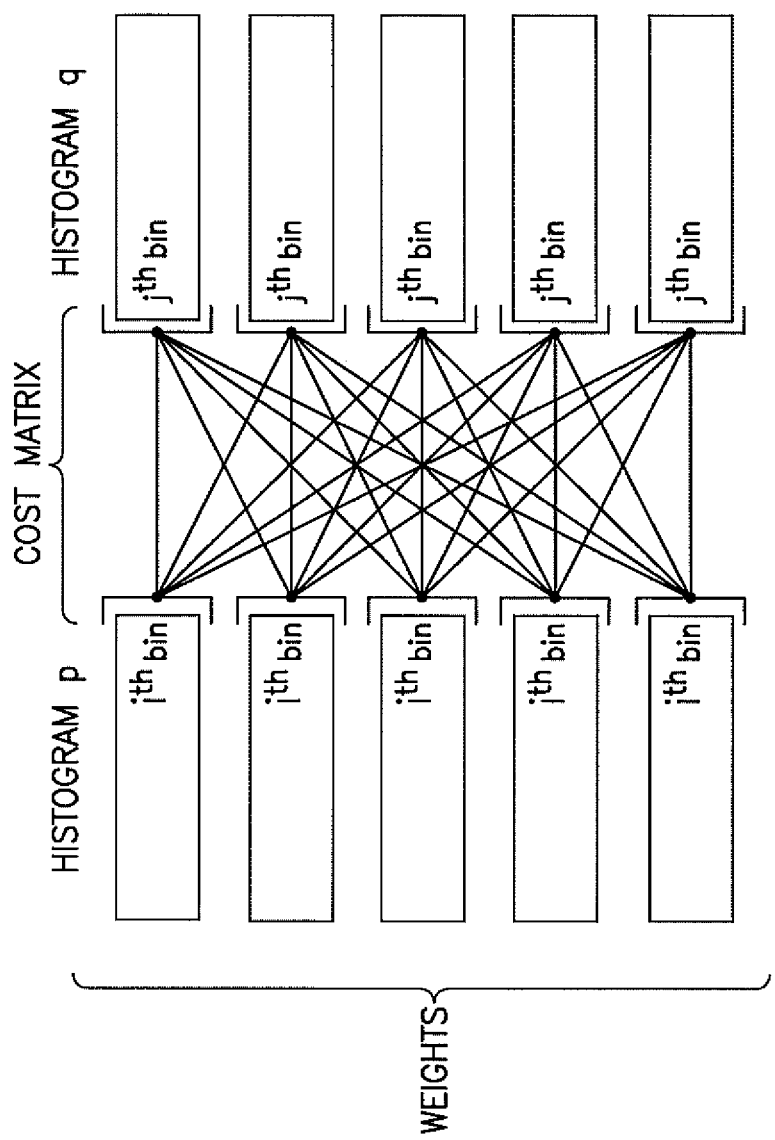
FIG. 1A and FIG. 1B are diagrams that schematically illustrates how to construct a histogram from a 2D image (FIG. 1A) and compute a distance between two histograms (FIG. 1B), based on a class of algorithms including the Earth Mover's Distance algorithm and algorithms derived therefrom.

Example embodiments of the invention as described herein may rely on novel distance measures that are more robust and provably more accurate than previous linear implementations of the RWMD method. Interestingly, the proposed distance measures are shown to be effective when evaluating the similarity between dense or overlapping probability distributions, e.g., color histograms. Advantageously, the new distance measures discussed can possibly be computed in linear time complexity (linear in the size of the input distributions), as in embodiments discussed below. For completeness, the present description addresses data-parallel and GPU-friendly implementations of the proposed distance computation algorithms and demonstrates their accuracy and runtime advantages. It is noted that any of the variables or values as described herein can comprise integers and/or other equation use variables or values for use in the example embodiments of the invention as described herein.

1. Preliminary Considerations

Let first focus on the Earth Mover's Distance algorithm, which can be considered as the discrete version of the Wasserstein distance, to quantify the affinity between discrete probability distributions. Each probability distribution is modelled as a histogram, wherein each bin is associated with a weight and a coordinate in a multi-dimensional vector space. For instance, when comparing images using color histograms, the weights are given by the pixel values and the coordinates are defined by the respective pixel positions (see FIG. 1A).

The distance between two histograms is calculated as the cost of transforming one histogram into the other. Transforming a first histogram into a second histogram amounts to move weights from the bins of the first histogram into the bins of the second, thereby constructing the second histogram from the first. The goal is to minimize the total distance travelled, wherein the pairwise distances between different histogram bins are computed based on their respective coordinates. This optimization problem is well studied in transportation theory and can be regarded as a discrete formulation of the Wasserstein distance.

Assume that histograms p and q are being compared, where p has $n_p$ entries and q has $n_q$ entries. Assume further that an $n_p \times n_q$ nonnegative cost matrix C is available. In the following, $p_i$ stands for the weight stored in the i-th bin of histogram p, whereas $q_j$ denotes the weight stored in the j-th bin of histogram q. Similarly, $C_{i,j}$ indicates the distance between the coordinates of the i-th bin of p and the j-th bin of q (see FIG. 1B). Suppose that the histograms are $L^1$-normalized: $\Sigma_i\ p_i = \Sigma_j q_j = 1$. The aim is to discover a (nonnegative) flow matrix F, where $F_{i,j}$ indicates how much of the bin i of p has to flow to the bin j of q, such that the cost of moving p into q is minimized. Formally, the objective of EMD is as follows:

$$EMD(p, q) = \min_{F_{i,j} \geq 0} \sum_{i,j} F_{i,j} \cdot C_{i,j} \quad (1)$$

A valid solution to EMD has to satisfy the so-called out-flow and in-flow constraints, see Eq. (2) and (3) below. An out-flow constraint ensures that, for each i of p, the sum of all the flows exiting i is equal to $p_i$. The in-flow constraint ensures that, for each j of q, the sum of all the flows entering j is equal to $q_j$. Such constraints guarantee that all the mass stored in p is transferred and q is reconstructed as a result. That is:

$$\Sigma_j F_{i,j} = p_i, \quad (2)$$

and $$\Sigma_i F_{i,j} = q_j, \quad (3)$$

Computation of EMD requires solution of a minimum cost-flow problem on a bi-partite graph, wherein the bins of histogram p are the source nodes, the bins of histogram q are the sink nodes, and the edges between the source and sink nodes indicate the pairwise transportation costs. Solving this problem optimally is known to take cubical time complexity in the size of the histograms.

To reduce the complexity, the RWMD approximation algorithm was proposed (Kusner et al. 2015), which involves the derivation of two asymmetric distances. First, the in-flow constraints are relaxed, and the relaxed optimization problem is solved using out-flow constraints only. The solution to the first relaxed problem is a lower bound on EMD. After that, out-flow constraints are relaxed, and a second relaxed optimization problem is solved using in-flow constraints only, which computes a second a lower bound on EMD. The RWMD result is the maximum of the two lower bounds obtained. Therefore, it is at least as tight as each of the two lower bounds. In addition, it is symmetric.

When computing RWMD between only two histograms, it is not possible to avoid a quadratic time complexity. However, in many practical use cases, a query histogram is compared to a large database of histograms. For instance, the goal might be to identify the top-k most similar histograms in the database. As previously shown (Atasu et al. 2017), in such cases, the RWMD computation involves redundant and repetitive operations, and eliminating such redundancy makes it possible to reduce the average time complexity from quadratic to linear (as in the so-called LC-RWMD method, where LD stands for linear complexity).

The algorithmic parameters that influence the complexity of RWMD can be noted as follows: n is the number of database histograms, v denotes the size of the vocabulary, m represents the dimensionality of the vectors, and h is the average histogram size. Table 1 below shows the complexity of RWMD and LC-RWMD algorithms when comparing one query histogram with n database histograms.

TABLE 1

Comparison between time and space complexities of the RWND and LC-RWMD algorithms

|  | Time Complexity | Space Complexity |
| --- | --- | --- |
| LC-RWMD | O(vhm + nh) | O(nh + vm + vh) |
| RWMD | O(nh²m) | O(nhm) |

When the number of database histograms (n) is on the order of the size of the vocabulary (v), the LC-RWMD algorithm reduces the complexity by a factor of h, i.e., the average size of the database histogram.

2. New Relaxation Algorithms

Given p, q and C (where C does not necessarily need to be precomputed but can instead be computed on-the-fly), the goal is now to define new distance measures that relax fewer EMD constraints than RWMD, and therefore, produce tighter lower bounds on EMD. In general, two asymmetric distances can be computed by deriving (i) the cost of moving p into q and (ii) the cost of moving q into p. If both are lower bounds on EMD (p, q), a symmetric lower bound can be derived, e.g., by using the maximum of the two. Thus, one may consider only the computation of the cost of moving p into q without loss of essential generality, as assumed in the following.

When computing the cost of moving p to q using RWMD, the in-flow constraints of Eq. (3) are removed. In other words, all the mass is transferred from p to the coordinates of q, but the resulting distribution is not the same as q. Therefore, the cost of transforming p to q is underestimated by RWMD. To achieve better approximations of EMD (p, q), we propose, instead of removing the in-flow constraints completely, using a relaxed version of these constraints, namely, $$F_{i,j} \leq q_j, \text{ for part of or all of the } \{i,j\} \text{ pairs.} \quad (4)$$

This new type of constraint ensures that the amount of weight that can be moved from a coordinate i of p to a coordinate j of q cannot exceed the weight $q_j$ at coordinate j. However, even if Eq. (4) is satisfied, the total weight moved to coordinate j of q from all the coordinates of p can exceed $q_j$, potentially violating Eq. (3). Namely, Eq. (3) implies (4), but the converse is not true.

2.1 Overlapping Mass Reduction

Like RWMD, the so-called Overlapping Mass Reduction (OMR) method discussed below relaxes the constraint of Eq. (3). However, it imposes Eq. (4) between overlapping coordinates. More formally, the OMR method computes the optimal solution to Eq. (1) under Eq. (2) and Eq. (4), where Eq. (4) is imposed between coordinates i and j only if $C_{i,j}=0$. Algorithm 1 below shows that the computation of the optimal solution to this problem involves a reduction step that removes some of the weights of the source histogram in the presence of overlaps. A main consideration underlying Algorithm 1 is that, if the coordinate i of p and the coordinate j of q overlap (i.e., $C_{i,j}=0$), a transfer of min ($p_i$, $q_j$) can take place free of cost between p and q. For each i of p, Algorithm 1 first computes the top-two closest coordinates in q. If the distance to the closest coordinate j=s[1] is equal to zero, the maximum possible amount of transfer allowed by the constraints of Eq. (2) and Eq. (4) are performed between bin i of p and bin j of q, which maximum amount is equal to min ($p_i$, $q_j$). Such a transfer incurs no cost and violates no constraints. Therefore, it is part of the optimal solution of OMR. After that, the remaining weight in p is transferred to the second closest coordinate k=s [2] in q as this is the next, least costly move that does not violate Eq. (4). Note that when there is no overlap between the coordinates of p and q, only the else statements of Algorithm 1 below are executed, in which case the useful computational steps of the OMR method would amount to those implemented in the auxiliary algorithm used (i.e., an adapted version of the RWMD in the present case). It should, however, be emphasized that the OMR method differs from the RWMD method in its implementation, be it because of the test performed (to test the distance to the closest coordinate j) and the subsequent algorithmic path. Also, overlapping histograms p and q will typically occur in practice, leading to different computational steps.

| Algorithm 1 Optimal Computation of OMR | |
|---|---|
| 1: function OMR(p, q, C) | |
| 2:    t = 0 | ▷ initialize transportation cost t |
| 3:    for i = 1 . . . , $n_p$ do | ▷ iterate the indices of p |
| 4:       s = argmin$_2$($C_{i,[1...n_q]}$) | ▷ find top-2 smallest |
| 5:       if $C_{i,s[1]}$ == 0 then | ▷ if the smallest value is 0 |
| 6:          r = min($p_i$, $q_{s[1]}$) | ▷ size of max. transfer |
| 7:          $p_i$ = $p_i$ − r | ▷ move r units of $p_i$ to $q_{s[1]}$ |
| 8:          t = t + pi · $C_{i,s[2]}$ | ▷ move the rest to $q_{s[2]}$ |
| 9:       else | |
| 10:         t = t + $p_i$ · $C_{i,s[1]}$ | ▷ move all of $p_i$ to $q_{s[1]}$ |
| 11:       end if | |
| 12:    end for | |
| 13:    return t | ▷ return transportation cost t |
| 14: end function | |

2.2 Iterative Constrained Transfers (ICT) Method

The ICT method discussed now relaxes the constraint of Eq. (3) as well. However, unlike OMR, it imposes the constraint Eq. (4) between all coordinates of p and q. Formally, the ICT method computes the optimal solution to Eq. (1) under Eq. (2) and Eq. (4), where Eq. (4) is now imposed between all {i,j} pairs.

Algorithm 2 below describes the computation of an optimal solution to this problem, which involves iterative constrained mass transfers between p and q. For each i of p, the ICT technique first sorts the i-th row $C_{i, [1 ... n_q]}$ of C in the ascending order, creating a list s such that $C_{i,s[l]} \leq C_{i,s[l+1]}$ for $l \in \{1, \ldots, n_q-1\}$. Here, $C_{i,s[l]}$ denotes the l-th smallest distance between coordinate i of p and coordinates in q, the list element s[l] being the respective index in q. Algorithm 2 first transfers a mass of min ($p_i$, $q_{s[l]}$) at a cost of $C_{i,s[1]}$. This corresponds to the largest transfer allowed under the constraint of Eq. (4), at the smallest cost. The weight in $p_i$ is accordingly reduced exactly by that amount. However, no reduction is applied to q. Next, a mass of min ($p_i$, $q_{s[2]}$) is moved at a cost of $C_{i,s[2]}$ using the reduced weight in $p_i$. This corresponds to the second largest transfer allowed under the constraint of Eq. (4), at the second smallest cost. Again, no reduction is applied to q. The iterations are continued until all the mass stored in $p_i$ is transferred to q, i.e., until the weight in $p_i$ is equal to 0.

| Algorithm 2 Optimal Computation of ICT | |
|---|---|
| 1: function ICT(p, q, C) | |
| 2:    t = 0 | ▷ initialize transportation cost t |
| 3:    for i = 1 . . . , $n_p$ do | ▷ iterate the indices of p |
| 4:       s = argsort($C_{i,[1...n_q]}$) | ▷ sort indices by value |
| 5:       l = 1 | ▷ initialize l |
| 6:       while $p_i$ > 0 do | ▷ while there is mass in $p_i$ |
| 7:          r = min($p_i$, $q_{s[l]}$) | ▷ size of max. transfer |
| 8:          $P_i$ = $P_i$ − r | ▷ move r units of $p_i$ to $q_{s[l]}$ |
| 9:          t = t + r · $C_{i,s[l]}$ | ▷ update cost |
| 10:         l = l + 1 | ▷ increment l |
| 11:       end while | |
| 12:    end for | |
| 13:    return t | ▷ return transportation cost t |
| 14: end function | |

Algorithm 2 can be regarded as computing an optimal flow F*, whose components are determined by the quantities r in step 4. Namely, the components of the i-th row of F*, are given recursively as $F^*_{i,s[1]}=\min(p_i, q_{s[1]})$ and $F^*_{i,s[l]} = \min(p_i - \Sigma_{u=1}^{l-1} F^*_{i,s[u]}, q_{s[l]})$ for $l=2, \ldots, n_q$.

Lemma 1 Each row i of the flow F* of Algorithm 2 has a certain number $k_i$, $1 \leq k_i \leq n_q$ of nonzero components, which are given by $F^*_{i,s[l]} = q_{s[l]}$ for $l=1, \ldots, k_i-1$ and $F^*_{i,s[k_i]} = p_i - \Sigma_{i+1}^{k_i-1} q_{s[l]}$.

The Lemma follows by keeping track of the values of the term r in step 4 in Algorithm 2. An immediate implication is that the flow F* satisfies the constraints Eq. (2) and Eq. (4). One can also show that F* is a minimal solution of Eq. (1) under the constraints Eq. (2) and Eq. (4). This leads to the following theorem.

Theorem 1 (i) The flow F* of Algorithm 2 is an optimal solution of the relaxed minimization problem given by Eqs. (1), (2) and (4). (ii) ICT provides a lower bound on EMD.

2.3 Approximate ICT (AICT) Method

The third algorithm discussed now (Algorithm 3) describes an approximate solution to ICT (hereafter AICT), which offers the possibility to terminate the ICT iterations before all mass is transferred from p to q. After performing a predefined number k of ICT iterations, the mass remaining in p is transferred to q using a distinct algorithm, e.g., an adapted version of RWMD, as assumed in the following. This results in an approximate solution. Algorithm 3 can be regarded as intermingling aspects of the LC-RWMD approach, together with aspects of Algorithm 1 and Algorithm 2 above. If the number of iterations were zero (i.e., corresponding to k=1), the useful computational steps of the AICT method discussed above would compare to RWMD. Yet, the number of iterations will be strictly larger than 0 in practice. Similarly, if p and q were defined on the same bin space with fully overlapping coordinates i,j in the range between 1 and $n_p=n_q$, a single iteration of AICT would effectively compare to the OMR approach. When p and q do not have fully overlapping coordinates, a single iteration of AICT computes a tighter lower bound on EMD than OMR does because AICT imposes the constraint of Eq. (4) between a larger set of coordinates of p and q, in comparison with OMR. Note that AICT unconditionally executes the if statement of Algorithm 1, which imposes the constraint of Eq. (4). Each iteration of AICT improves the lower bound further. Performing a sufficiently large number of iterations will move all the mass from p to q. In such a case, a final approximation is unnecessary, and AICT is equal to ICT. Similar to Algorithm 2, Algorithm 3 also determines an optimum flow F*, which now depends on the number of iterations, which is determined by k.

Lemma 2 Each row i of the flow F* of Algorithm 3 has a certain number $k_i$, $1 \leq k_i \leq k$ of nonzero components, which are given by $F^*_{i,s[l]} = q_{s[l]}$ for $l=1, \ldots, k_i-1$ and $F^*_{i,s[k_i]} = p_i - \sum_{l=1}^{k_i-1} q_{s[l]}$.

Based on this Lemma, it is possible to show that the flow F* from Algorithm 3 is an optimal solution to the minimization problem given by Eq. (1), Eq. (2) and Eq. (4), in which the constraint Eq. (4) is further relaxed based on the predetermined parameter k. Since the constrained minimization problems for ICT, AICT, OMR, and RWMD form a chain of increased relaxations of EMD, one obtains the following result.

Theorem 2 For two normalized histograms p and q: RWMD(p, q) $\leq$ OMR(p, q) $\leq$ AICT(p, q) $\leq$ ICT(p, q) $\leq$ EMD(p, q).

Call a nonnegative cost function C "effective", if for any indices i,j, the equality $C_{i,j}=0$ implies i=j. For a topological space, this condition is related to the Hausdorff property. For an effective cost function C, one has $C_{i,j} > 0$ for all i≠j, and, in this case, OMR(p, q) = $\Sigma_{i,j} C_{i,j} F^*_{i,j} = 0$ implies $F^*_{i,j} = 0$ for i≠j. Thus, $k_i=1$ in Lemma 2 and, therefore, F* is diagonal with $F^*_{i,j} = p_i$. This, in turn, implies $p_i \leq q_i$ for all i and since both histograms are normalized one must have p=q.

Theorem 3 If the cost function C is effective, then OMR(p, q)=0 implies p=q, i.e., OMR is effective.

Remark 1 If OMR is effective, then, a fortiori, AICT and ICT are also effective. However, RWMD does not share this property.

---

Algorithm 3 Approximate Computation of ICT

```
 1:  function AICT(p, q, C, k)
 2:      t = 0                          ▷ initialize transportation cost t
 3:      for i = 1 ..., n_p do          ▷ iterate the indices of p
 4:          s = argmin_k(C_{i,[1...n_q]})   ▷ find top-k smallest
 5:          l = 1                      ▷ initialize l
 6:          while l < k do
 7:              r = min(p_i, q_{s[l]})     ▷ size of max. transfer
 8:              P_i = P_i − r              ▷ move r units of p_i to q_{s[l]}
 9:              t = t + r · C_{i,j}        ▷ update cost
10:              l = l + 1                  ▷ increment l
11:          end while
12:          if p_i ≠ 0 then            ▷ if p_i still has some mass
13:              t = t + p_i · C_{i,s[k]}   ▷ move the rest to q_{s[k]}
14:          end if
15:      end for
16:      return t                       ▷ return transportation cost t
17:  end function
```

---

The algorithms presented above assume that the cost matrix C is given. And yet, such algorithms still have a quadratic time complexity in the size of the histograms. Assume that the histograms size is O(h). Then, the size of C is $O(h^2)$. The complexity of the above algorithms is determined by the row-wise reduction operations on C. For the OMR method, the top-2 smallest values are computed in each row of C and a maximum of two updates are performed on each bin of p. Therefore, the complexity is $O(h^2)$. For the AICT method, the top-k smallest values are computed in each row, and up to k updates are performed on each histogram bin. Therefore, the complexity is $O(h^2 \log k + hk)$. The ICT method is the most expensive one because (i) it fully sorts the rows of C, and (ii) it requires O(h) iterations in the worst case. Its complexity is given by $O(h^2 \log h + h^2)$.

3. Linear-Complexity Implementations

In this section, we focus on the AICT method because (i) it somehow generalizes the three novel methods presented, and (ii) its complexity and accuracy can be controlled by setting the number k of iterations performed. We describe a linear complexity implementation of AICT and provide its complexity bounds. Unlike the previous section, we do not assume that the cost matrix is given, but instead construct the transportation costs on the fly. Hence, our analysis also takes into account the complexity of computing such costs.

Figure 2:
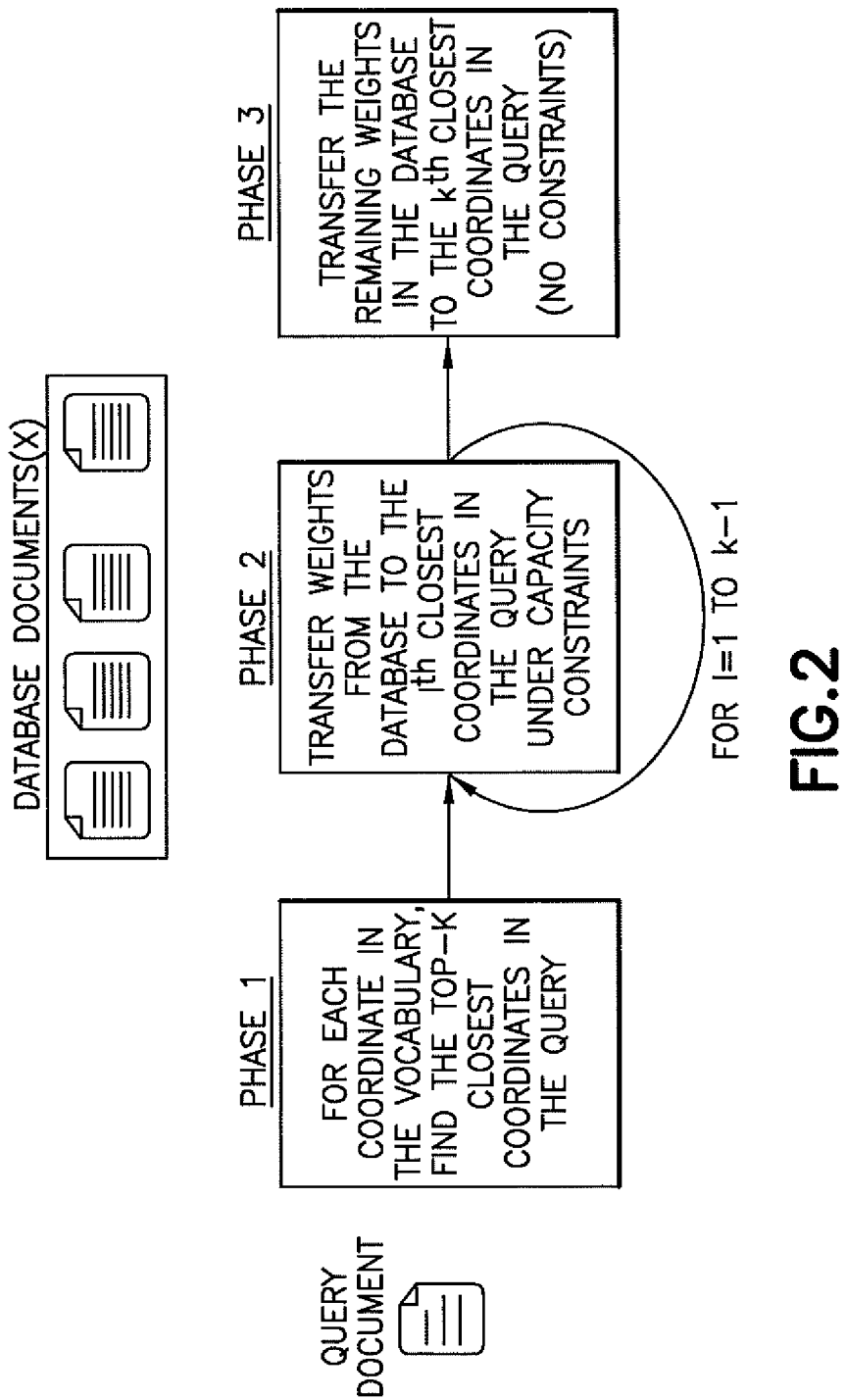
FIG. 2 is a flowchart illustrating high-level steps of a method for assessing distances between pairs of histograms, which method involve three phases, each of linear complexity, as in embodiments.

A high-level view of the linear-complexity AICT algorithm (called LC-AICT) is given in FIG. 2. LC-AICT bears resemblance with the so-called LC-RWMD method. Like LC-RWMD, it assumes that (i) a query histogram is compared with a large number of database histograms, and (ii) the coordinate space is populated by the members of a fixed-size vocabulary. Like LC-RWMD, LC-AICT eliminates redundant and repetitive operations when comparing one query histogram with a large number of database histograms. The linear complexity is achieved if the number of database documents n and the size of the vocabulary v are on the same order.

Whereas the LC-RWMD method has essentially two phases, the LC-AICT method has three. The first and last phases of LC-AICT bears resemblance with the two phases of the LC-RWMD method. Still, the LC-AICT and LC-RWMD methods notably differ in the iterations performed during the second phase of LC-AICT. Note, the second phase may possibly be bypassed by setting k=1 (0 iterations). In such a case, for each coordinate in the vocabulary, the distance to the closest coordinate in the query is first computed (Phase 1). After that, Phase 3 performs a matrix-vector multiplication directly between the database histograms and the distances computed during Phase 1.

Phase 2 of LC-AICT is analogous to the computation inside the while loop of Algorithm 3. Similarly, Phase 3 of LC-AICT is analogous to the computation inside the if statement of Algorithm 3. Remember that AICT improves on the lower-bound computed by RWMD when the while loop of Algorithm 3 is executed (at least once, i.e., k>1). Similarly, LC-AICT improves on the lower-bounds computed by LCRWMD when Phase 2 is executed at least once.

Figure 3:
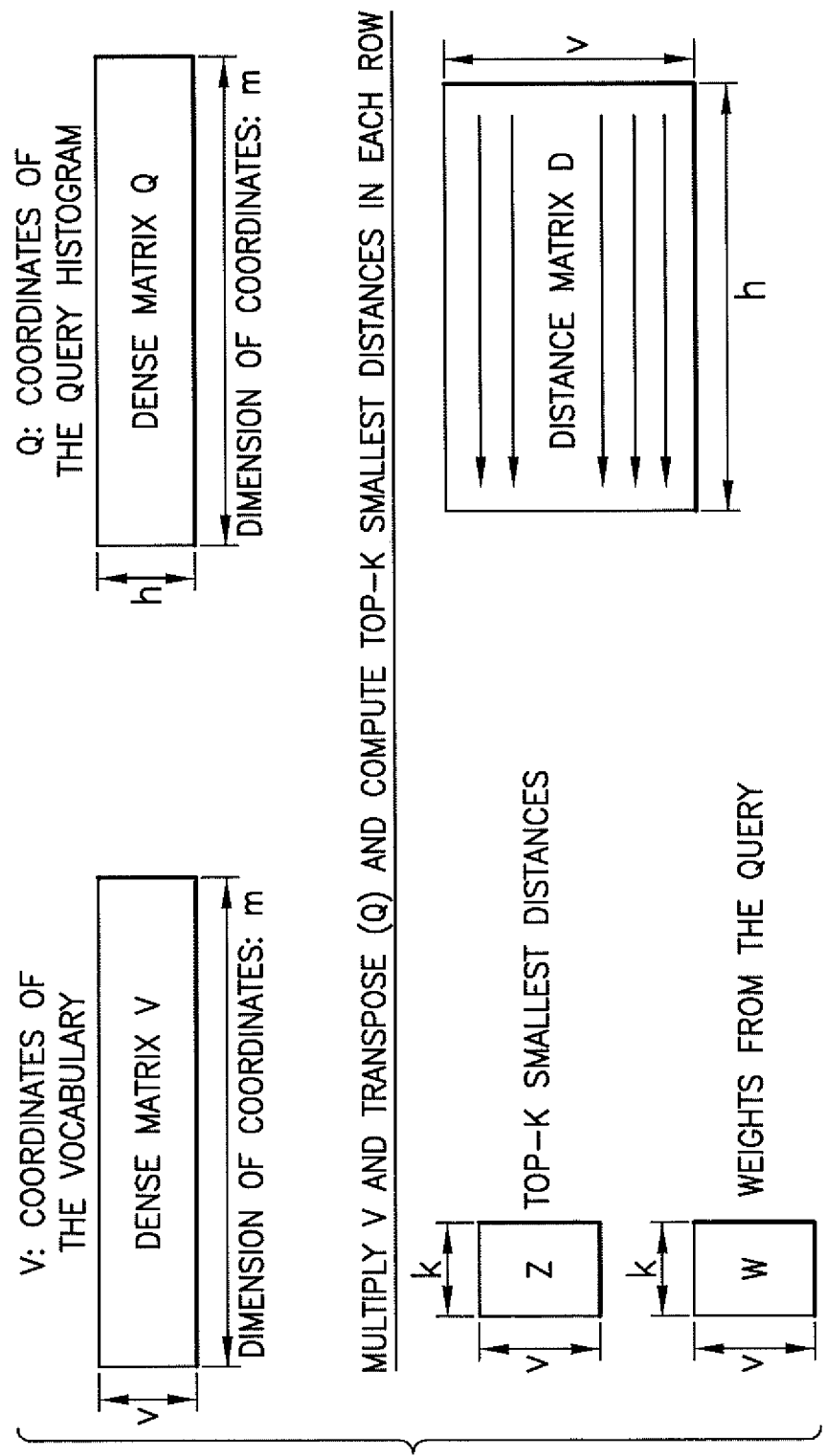
FIGS. 3 and 4 are diagrams illustrating the first and second phases of the method of FIG. 2, as in embodiments.

Suppose that the dimension of the coordinates is m and the size of the vocabulary is v. Let V be a v×m matrix that stores this information. Given a query histogram q of size h, we construct a matrix Q of size h×m that stores the coordinates of the histogram entries. Phase 1 of LC-AICT (see FIG. 3) performs a matrix-matrix multiplication between V and the transpose of Q to compute all pairwise distances between the coordinates of the vocabulary and the coordinates of the query. The result is a v×h distance matrix, denoted by D. As a next step, the top-k smallest distances are computed in each row of D. The result is stored in a v×k matrix Z. Furthermore, we store the indices of q that are associated with the top-k smallest distances in a v×k matrix S. We can then construct another v×k matrix W, which stores the corresponding weights of q by defining $W_{i,j} = q_{s_{i,j}}$ for i=1, ..., v and =1, ..., k. The matrices Z and W are then used during Phase 2 to transport the largest possible mass, which are constrained (by virtue of W) to the smallest possible distances, which are given by Z.

Figure 4:
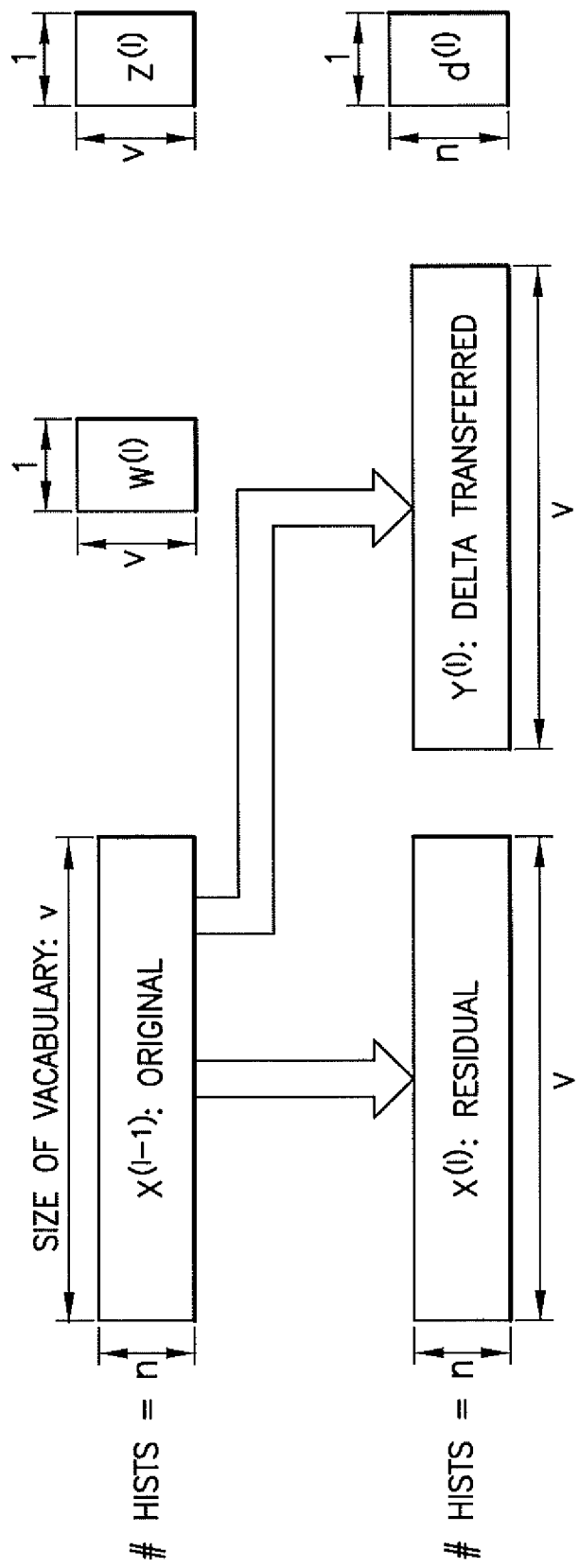

The database histograms are stored in a matrix X (see FIG. 4), wherein each row is a database histogram. The database histograms are typically sparse. Therefore, the matrix X is stored using a sparse representation, e.g., in compressed sparse rows (csr) format. For simplicity, assume that X is stored in a dense format and $X_{u,i}$ stores the weight of the i-th coordinate of the vocabulary in the u-th database histogram. Assume that the histograms have on average h entries. Then, the number of nonzeros in matrix X is nh.

Phase 2 of AICT iterates the columns of Z and W and iteratively transfers weights from the database histograms X to the query histogram q. Let $X^{(l)}$ represent the residual mass remaining in X after l iterations, where $X^{(0)}$=X. Let $Y^{(l)}$ store the amount of mass transferred from $X^{(l-1)}$ at iteration l, which is the difference between $X^{(l-1)}$ and $X^{(l)}$. Let $z^{(l)}$ and $w^{(l)}$ be the l-th columns of Z and W, respectively; thus, $z_u^{(l)}$ is the l-th smallest distance between the coordinate u of the vocabulary and the coordinates of the query, and $w_u^{(l)}$ is the respective weight of the query coordinate that produces the l-th smallest distance. The iteration l of Phase 2 computes $Y^{(l)}$ and $X^{(l)}$ as follows:

$$Y_{u,i}^{(l)} = \min_{\substack{u \in (1...v) \\ i \in (1...v)}} (X_{u,i}^{(l-1)}, w_u^{(l)}), \text{ and} \quad (5)$$

$$X^{(l)} = X^{(l-1)} - Y^{(l)}. \quad (6)$$

The cost of transporting $Y^{(l)}$ to q is given by $Y^{(l)} \cdot z^{(l)}$. Let $t^{(l)}$ be a vector of size n that accumulates all the transportation costs incurred between iteration 1 and iteration l:

$$t^{(l)} = t^{(l-1)} + Y^{(l)} \cdot z^{(l)} \quad (7)$$

After k−1 iterations at Phase 2, there might still be some mass remaining in $X^{(l-1)}$. Phase 3 approximates the cost of transporting the remaining mass to q by multiplying $X^{(l-1)}$ by $z^{(k)}$. The overall transportation cost $t^{(k)}$ is thus given by:

$$t^{(k)} = t^{(k-1)} + X^{(l-1)} \cdot z^{(k)} \quad (8)$$

The complexity of Phase 1 is O(vhm+nh log k) because the complexity of the matrix multiplication to compute D is O(vhm), and the complexity of computing the top-k smallest distances in each row of D is O(nhlogk). The computation complexity associated with Eqs. (5), (6), (7), and (8) is O(nh) each. When k−1 iterations are performed during Phase 2, the overall time complexity of LC-AICT is O(vhm+knh). Note, when the number of iterations k performed by LC-AICT is constant, LC-AICT and LC-RWMD happens to have the same time complexity.

TABLE 2

Complexity of the LC-AICT method

| | Time | Space |
|---|---|---|
| 1 iteration | O(vhm + nh) | O(nh + vm + vh) |
| k iterations | O(vhm + knh) | O(nh + vm + vh + vk) |

When the number of iterations are on the order of the dimensionality of the coordinates (i.e., O(k)=O(m)) and the database is sufficiently large (i.e., O(n)=O(v)), LC-AICT and LC-RWMD again have the same time complexity, which increases linearly in the size of the histograms h. Table 2 above shows the time and space complexity of the LC-AICT method.

Main building blocks of the preferred implementations of the present algorithms are matrix-matrix or matrix-vector multiplications, row-wise top-k calculations, and parallel element-wise updates. All of these operations can be made data-parallel and vectorized on GPUs.

4. Experiments

We performed experiments using two public datasets: "20 Newsgroups" is a text database of approximately 20 k newsgroup documents (see, e.g., http://qwone.com/jason/20Newsgroups/), partitioned evenly across 20 different classes, and "MNIST" is an image database of 60 k grey-scaled handwritten digits partitioned evenly across 10 classes (see, e.g., http://yann.lecun.com/exdb/mnist/).

Figure 1A:
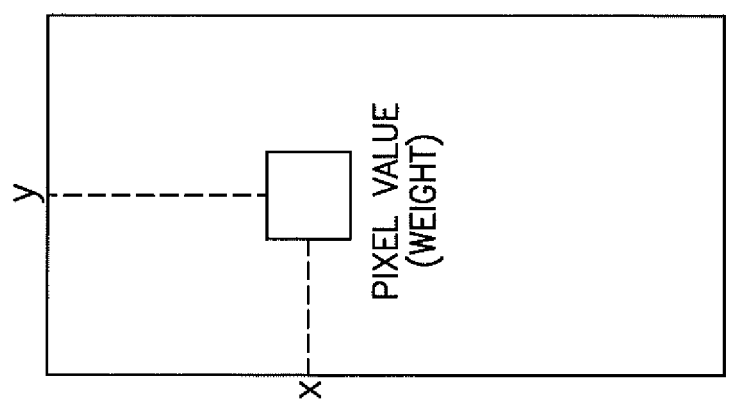

The MNIST images are mapped onto two-dimensional histograms, as illustrated in FIG. 1B; the weights are normalized pixel values. The words in the 20 Newsgroups documents are mapped onto a high-dimensional embedding space using Google's word and phrase vectors as pre-trained on Google News (see https://code.google.com/archive/p/word2vec/), for which the size of the vocabulary (v) is 3 million words and phrases, and embedding vectors are composed of m=300 single-precision floating-point numbers. For the 20 Newsgroups dataset, the histogram weights are determined by normalizing the word (term) frequencies. We treated each document of the database as a query and compared it with every other document in the database. Based on the similarity or the distance measure used in the comparison, for each query document, we identified the top-K nearest neighbors in the database. After that, for each query document, we computed the percentage of documents in its nearest-neighbors list that have the same class label. We averaged this metric over all the database documents and computed it as a function of the parameter K. The result is the average precision at top-K for the whole database We compared our distance measures with cosine similarity and the Word Centroid Distance (WCD) measures, both of which exhibit a low algorithmic complexity. The cosine similarity method does not use the proximity information provided by the embedding vectors. The complexity of computing cosine similarity between one query histogram and n database histograms is O(nh) using a sparse representation. The WCD measure (Kusner et al. 2015) computes a centroid vector of size m for each document, which is a weighted average of the embedding vectors. Given the centroids, the complexity of computing WCD between one query document and n database documents is O(nm).

TABLE 3

Runtime (seconds) for different methods used

| | WCD | Cosine | RWMD | OMR | AICT (1) |
|---|---|---|---|---|---|
| 20 News | 4.2 | 7.3 | 39.6 | 57.1 | 59.3 |
| MNIST | 12.7 | 30.7 | 35.1 | 152.5 | 200.7 |

The complexity of the OMR and AICT(1) methods proposed here is higher than the complexity of the WCD or the Cosine method, i.e., on the order of O(nhm). The reason is that we take into account all the words that occur in the documents individually as well as their proximity to each other. Note, the cosine similarity method is harder to vectorize than the remaining methods because it relies on sparse matrix operations.

We developed data-parallel and GPU-accelerated implementations of the WCD, RWMD, OMR, AICT, and cosine similarity methods, and evaluated their performance on an NVIDIA® GTX 1080Ti GPU (see Table 4). The runtime overhead of the novel methods is less than 50% with respect to RWMD for the 20 Newsgroups dataset. In addition, despite the relatively large number of dimensions (m=300), the runtime increase with respect to the cosine similarity is less than ten-fold. For the MNIST database, because the number of dimensions is very small (m=2), RWMD is as fast as the cosine similarity. Even though the runtime of Phase 2 of the AICT method becomes more significant than that of its Phase 1, the runtime increase with respect to cosine similarity is still less than ten-fold. Notably, for the MNIST database, 3.6 billion AICT computations were performed in about 3.3 minutes only.

Figure 5:
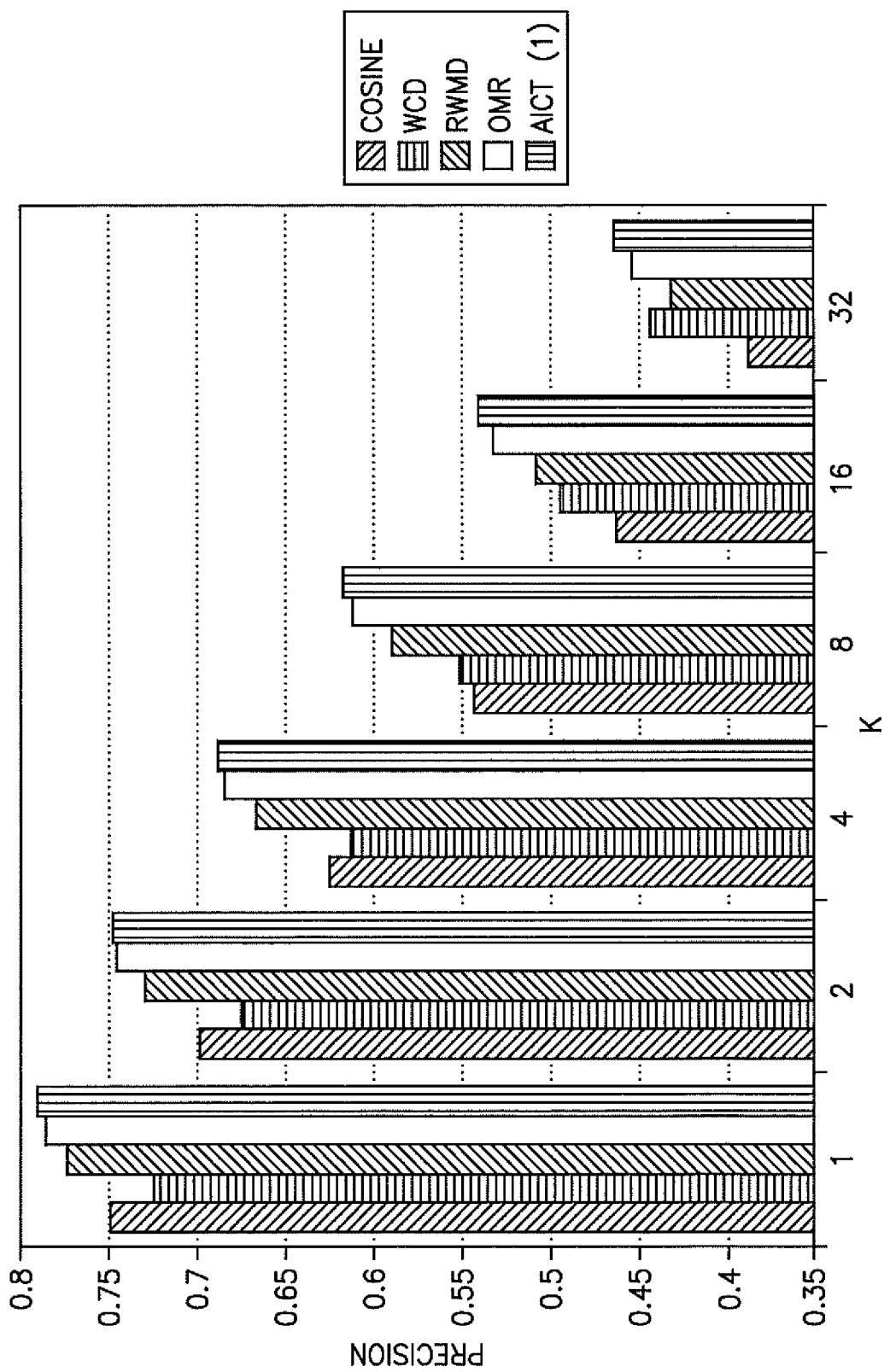
FIG. 5, FIG. 6, and FIG. 7 are bar and line charts comparing the precision obtained with different methods, including methods according to embodiments.

FIG. 5 compares different distance measures using the 20 Newsgroups dataset. The OMR measure consistently outperforms cosine similarity, RWMD, and WCD measures. A single iteration of AICT measure improves the precision. Additional iterations of AICT improve the precision further. The improvement achieved over the cosine similarity and RWMD increases as a function of K. However, WCD exhibits the opposite trend.

Figure 6:
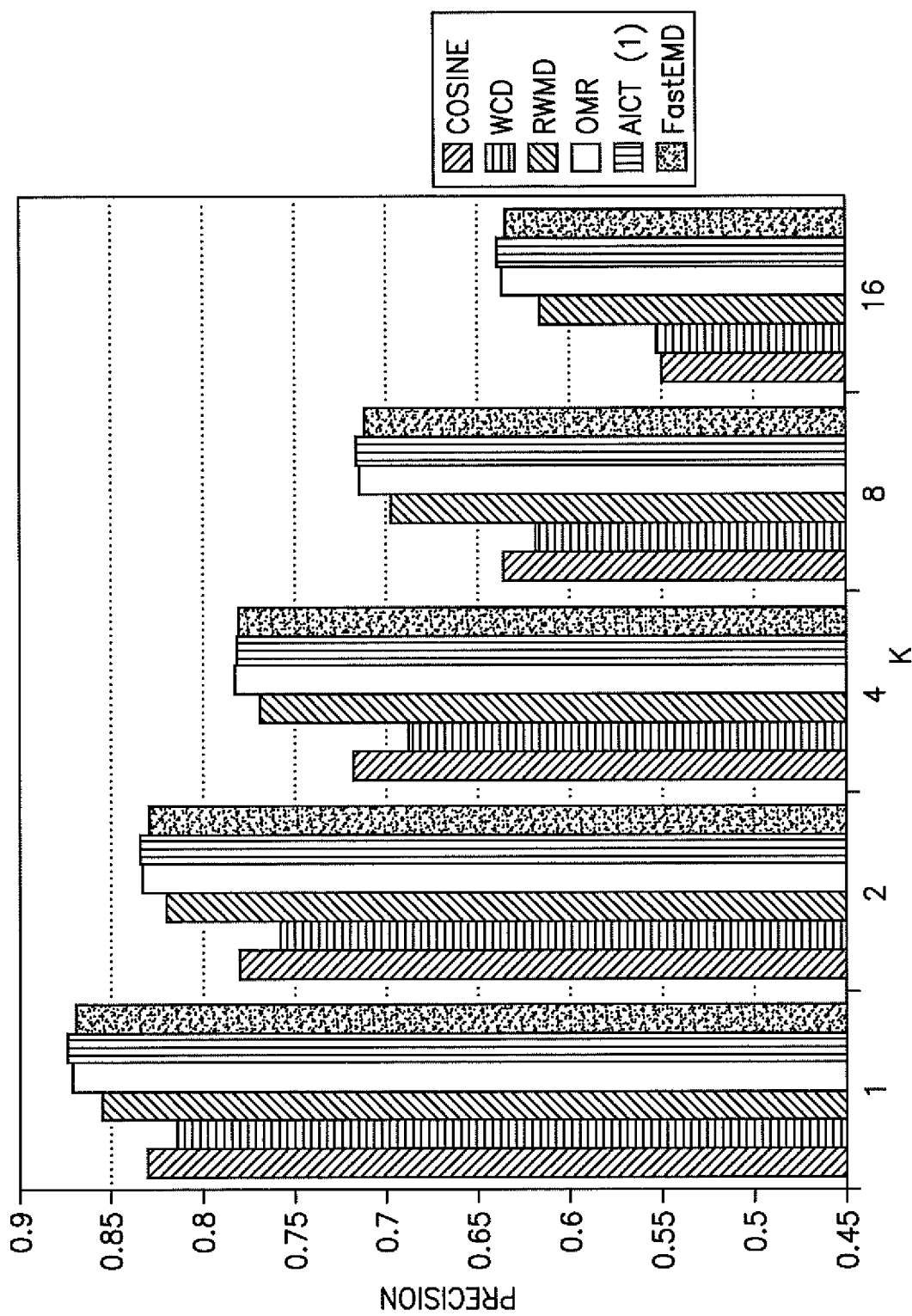

We have further compared our results with the so-called FastEMD algorithm (Pele and Werman 2009). The FastEMD algorithm applies a thresholding technique to reduce the complexity of the EMD computation. In our experiments, we simply used the default parameters of FastEMD. To speed-it up, we applied RWMD-based pruning techniques (Kusner et al. 2015) and deployed a multi-threaded implementation of the pruning algorithm on an 8-core Intel® i7-6900K CPU. Obtaining FastEMD results for only a subset of the 20 Newsgroups dataset (three out of the 20 groups) took more than two days of execution. FIG. 6 shows that the OMR and the AICT methods resulted in a similar or better accuracy for the same subset. Notably, such methods performed the same number of distance computations in approximately ten seconds only, which means a 20 000-fold performance improvement without any loss of accuracy in that case. Note, it took more than three weeks of computations to obtain FastEMD results for the complete 20 Newsgroups data set. I.e., a single iteration of AICT is 30 000 times faster than FastEMD in this case, whereas the differences observed between the precision achieved by AICT and FastEMD are only marginal.

Figure 7:
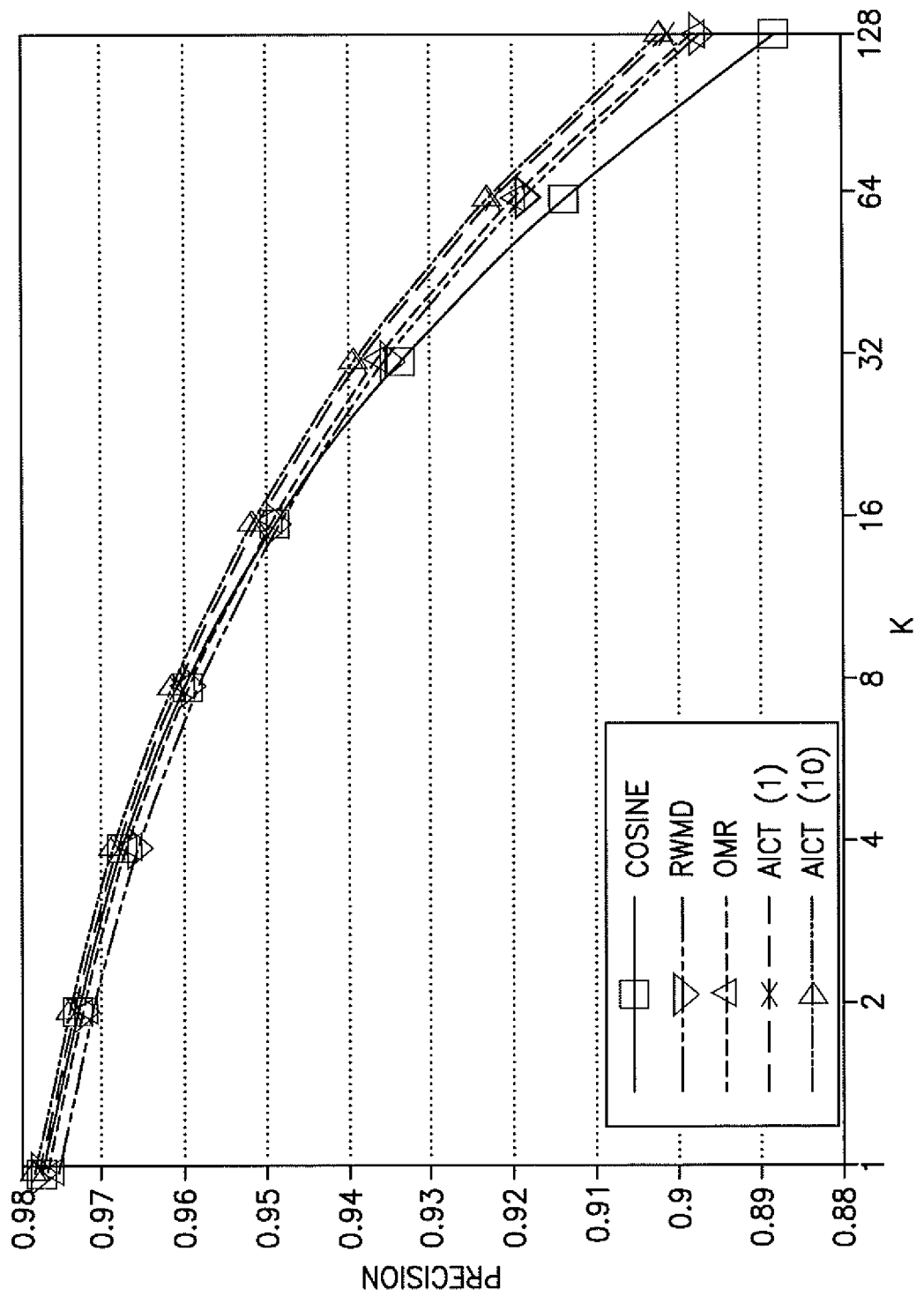

FIG. 7 compares different distance measures using the MNIST dataset. In this case, the number of dimensions is too small for WCD to be effective. However, the images are normalized and centered, which makes the cosine similarity extremely effective. Nevertheless, the novel methods proposed herein consistently outperform the cosine similarity. Even though the improvements are modest in comparison to the 20 Newsgroups results, the differences become more evident for large K.

Table 4 illustrates the sensitivity of RWMD to a minor change in the data representation. Here, we simply explore the impact of including the background (i.e. the black pixels) in the MNIST histograms.

The most immediate result is that when comparing two histograms, all their coordinates overlap. As a result, the distance computed between the histograms by RWMD is always equal to zero, and the top-K nearest neighbors are randomly selected, resulting in a precision of 10% for RWMD. The OMR technique solves this problem immediately even though its accuracy is lower than that of the cosine similarity. In fact, several iterations of AICT are required to outperform the cosine similarity results. Still, the results obtained illustrate the improved robustness and effectiveness of the present methods in comparison to RWMD.

TABLE 4

Precision at top-K for MNIST (with background)

| K | WCD | Cosine | RWMD | OMR | AICT (10) |
|---|---|---|---|---|---|
| 1 | 0.2644 | 0.9770 | 0.1123 | 0.9707 | 0.9771 |
| 16 | 0.1398 | 0.9479 | 0.1002 | 0.9368 | 0.9504 |
| 128 | 0.1061 | 0.8873 | 0.1002 | 0.8692 | 0.8977 |

Embodiments discussed herein provide novel theoretical and practical results for improving the efficiency and scalability of approximate EMD computations over high-dimensional histograms. We have notably identified the main shortcomings of the popular RWMD measure and proposed new distance measures that result in an improved precision and robustness without increasing the computational complexity significantly. Under realistic assumptions, the complexity of the novel methods proposed herein scale linearly in the size of the histograms. We also proposed data parallel implementations that are suitable for GPU acceleration. Our experiments prove the effectiveness of our algorithms on both text and images, demonstrating a 20000-fold improvement of the performance with respect to the so-called FastEMD library without sacrificing any accuracy.

The above embodiments have been succinctly described in reference to the accompanying drawings and may accommodate a number of variants. Several combinations of the above features may be contemplated.

2. Specific Embodiments—Technical Implementation Details 2.1. Parallel Implementations of the Present Methods We have developed GPU-accelerated and distributed implementations of the linear-complexity algorithms discussed herein as well as the more straightforward quadratic-complexity RWMD approach and demonstrated excellent scalability for both. Such implementations notably use the so-called NVIDIA's CUBLAS library and the NVIDIA's Thrust library. In particular, the dot-product operations can be performed using CUBLAS. Phase 1 of the LC-AICT algorithm uses the CUBLAS library for computing Euclidean distances, and then the Thrust library for computing row-wise minimums. In Phase 3, the NVIDIA's CUSPARSE library can be used for multiplication operations.

All algorithms described in section 1 can be made data-parallel and easily be distributed across several GPUs. Note, spreading the database histograms across several GPUs is sufficient. The only function that may require communication across multiple GPU nodes in a distributed setting is the top-K computation. However, the respective communication overhead is typically marginal compared to the cost of the distance computation algorithms.

2.2 Computerized Systems and Devices

More generally, computerized systems and devices can be suitably designed for implementing example embodiments of the invention as described herein. In that respect, it can be appreciated that the methods described herein are largely non-interactive and automated. In exemplary embodiments, the methods described herein can be implemented either in an interactive, partly-interactive or non-interactive system. The methods described herein can be implemented in software, hardware, or a combination thereof. In exemplary embodiments, the methods described herein are implemented in software, as an executable program, the latter executed by suitable digital processing devices. More generally, example embodiments of the invention can be implemented wherein virtual machines and/or general-purpose digital computers, such as personal computers, workstations, etc., are used.

For instance, the system depicted in FIG. 8 schematically represents a computerized unit 101, e.g., a general- or specific-purpose computer. In exemplary embodiments, in terms of hardware architecture, as shown in FIG. 8, the unit 101 includes at least one processor 105, and a memory 110 coupled to a memory controller 115. Preferably though, several processors (CPUs, and/or GPUs) are involved, to allow parallelization, as discussed earlier. To that aim, the processing units may be assigned respective memory controllers, as known per se.

One or more input and/or output (I/O) devices 145, 150, 155 (or peripherals) are communicatively coupled via a local input/output controller 135. The input/output controller 135 can be coupled to or include one or more buses and a system bus 140, as known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor(s) 105 is a hardware device for executing software, particularly that stored in memory 110. The processor(s) 105 can be any custom made or commercially available processor(s), may include one or more central processing units (CPUs) and/or one or more graphics processing units (GPUs), or, still, have an architecture involving auxiliary processors among several processors associated with the computer 101. In general, it may involve any type of semiconductor-based microprocessor (in the form of a microchip or chip set), or generally any device for executing software instructions.

The memory 110 can include any one or combination of volatile memory elements (e.g., random access memory) and nonvolatile memory elements. Moreover, the memory 110 may incorporate electronic, magnetic, optical, and/or other types of storage media. Note that the memory 110 can have a distributed architecture, where various components are situated remote from one another, but can be accessed by the processor(s) 105.

The software in memory 110 may include one or more separate programs, each of which comprises an ordered listing of executable instructions for implementing logical functions. In the example of FIG. 8, the software in the memory 110 includes computerized methods, forming part of all of methods described herein in accordance with exemplary embodiments and, in particular, a suitable operating system (OS) 111. The OS 111 essentially controls the execution of other computer programs and provides scheduling, input-output control, file and data management, memory management, and communication control and related services.

The methods described herein (or part thereof) may be in the form of a source program, executable program (object code), script, or any other entity comprising a set of instructions to be performed. When in a source program form, then the program needs to be translated via a compiler, assembler, interpreter, or the like, as known per se, which may or may not be included within the memory 110, so as to operate properly in connection with the OS 111. Furthermore, the methods can be written as an object-oriented programming language, which has classes of data and methods, or a procedure programming language, which has routines, subroutines, and/or functions.

Possibly, a conventional keyboard and mouse can be coupled to the input/output controller 135. Other I/O devices 140-155 may be included. The computerized unit 101 can further include a display controller 125 coupled to a display 130. In exemplary embodiments, the computerized unit 101 can further include a network interface or transceiver 160 for coupling to a network, to enable, in turn, data communication to/from other, external components.

The network transmits and receives data between the unit 101 and external devices. The network is possibly implemented in a wireless fashion, e.g., using wireless protocols and technologies, such as Wifi, WiMax, etc. The network may be a fixed wireless network, a wireless local area network (LAN), a wireless wide area network (WAN) a personal area network (PAN), a virtual private network (VPN), intranet or other suitable network system and includes equipment for receiving and transmitting signals.

The network can also be an IP-based network for communication between the unit 101 and any external server, client and the like via a broadband connection. In exemplary embodiments, network can be a managed IP network administered by a service provider. Besides, the network can be a packet-switched network such as a LAN, WAN, Internet network, an Internet of things network, etc.

If the unit 101 is a PC, workstation, intelligent device or the like, the software in the memory 110 may further include a basic input output system (BIOS). The BIOS is stored in ROM so that the BIOS can be executed when the computer 101 is activated. When the unit 101 is in operation, the processor(s) 105 is(are) configured to execute software stored within the memory 110, to communicate data to and from the memory 110, and to generally control operations of the computer 101 pursuant to the software.

The methods described herein and the OS 111, in whole or in part are read by the processor(s) 105, typically buffered within the processor(s) 105, and then executed. When the methods described herein are implemented in software, the methods can be stored on any computer readable medium, such as storage 120, for use by or in connection with any computer related system or method.

2.2 Computer Program Products

The embodiments of the invention may be implemented as a computerized method, and/or a computer program product at any possible technical detail level of integration. The computer program product may include a computer readable storage medium (or media) having computer readable program instructions thereon for causing a processor to carry out aspects in accordance with the example embodiments of the invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations in accordance with example embodiments of the invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects in accordance with example embodiments of the invention.

Aspects in accordance with example embodiments of the invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various example embodiments of the invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the invention has been described with reference to a limited number of embodiments, variants and the accompanying drawings, it will be understood by those skilled in the art that various changes may be made, and equivalents may be substituted without departing from a scope of the invention. In particular, a feature (device-like or method-like) recited in a given embodiment, variant or shown in a drawing may be combined with or replace another feature in another embodiment, variant or drawing, without departing from the scope of the invention. Various combinations of the features described in respect of any of the above embodiments or variants may accordingly be contemplated, that remain within the scope of the appended claims. In addition, many minor modifications may be made to adapt a particular situation or material to the teachings of the invention without departing from its scope. Therefore, it is intended that the invention not be limited to the particular embodiments disclosed, but that the invention will include all embodiments falling within the scope of the appended claims. In addition, many other variants than explicitly touched above can be contemplated.

What is claimed is:

1. A computer-implemented method, comprising:
   querying features of a digital object as respective vectors;
   deriving a queried histogram q based on the respective vectors;
   assessing distances between pairs of histograms comprising the queried histogram q and one of a plurality of histograms p stored in a histogram database, wherein each of the histograms is a representation of a digital object and said representation comprises bins associating weights to respective vectors, the latter representing respective features of said digital object, and wherein the method further comprises, for each pair {p, q} of histograms p and q of said pairs of histograms:
   computing a distance between p and q of said each pair {p, q}, comprising:
   computing said distance using linear algebra primitives of a first library according to a cost of moving p into q, so as to obtain a flow matrix F, whose matrix elements $F_{i,j}$ indicate, for each pair {i,j} of bins of p and q, how much weight of a bin i of p has to flow to a bin j of q to move p into q, by minimizing a quantity $\Sigma_{i,j} F_{i,j} \cdot C_{i,j}$, where $C_{i,j}$ is a matrix element of a cost matrix C representing said cost, and minimizing using linear algebra primitives of a second library, said quantity $\Sigma_{i,j} F_{i,j} \cdot C_{i,j}$ under two flow constraints, these including a relaxed flow constraint $F_{i,j} \leq r_{i,j}$ and a complementary flow constraint, wherein the relaxed flow constraint $F_{i,j} \leq r_{i,j}$ is applied for at least some of the pairs {i,j}, with $r_{i,j}$ equal to $p_i$ or $q_j$, where $p_i$ and $q_j$ are weights associated to bins i and j of p and q, respectively, and the complementary flow constraint is either an out-flow constraint $\Sigma_j F_{i,j} = p_i$ if $r_{i,j} = q_j$ or an in-flow constraint $\Sigma_i F_{i,j} = q_j$ if $r_{i,j} = p_i$; and wherein the first and second libraries comprise linear algebra primitives of general-purpose computing on one or more graphics processing units.

2. The computer-implemented method according to claim 1, wherein said distance is computed twice, one time by imposing the out-flow constraint $\Sigma_j F_{i,j} = p_i$, for all i, while imposing the relaxed, in-flow constraint $F_{i,j} \leq q_j$, and another time by imposing the in-flow constraint $\Sigma_i F_{i,j} = q_j$, for all j, while imposing the relaxed, out-flow constraint $F_{i,j} \leq p_i$.

3. The computer-implemented method according to claim 1, wherein the relaxed constrain $F_{i,j} \leq r_{i,j}$ is only applied where $C_{i,j} = 0$.

4. The computer-implemented method according to claim 3, wherein computing said distance further comprises, where $C_{i,j} = 0$, removing the weight corresponding to one of bin i of p and bin j of q, depending on whether the relaxed constraint $F_{i,j} \leq p_i$ or $F_{i,j} \leq q_j$ is applied, respectively.

5. The computer-implemented method according to claim 4, wherein computing said distance further comprises:

computing the two smallest values in each row or column of C, depending on whether the relaxed constraint $F_{i,j} \leq p_i$ or $F_{i,j} \leq q_j$ is applied, respectively; and evaluating a cost of moving weights from p to q, as allowed under both the relaxed constraint and the complementary constraint applied, according to the two smallest values computed.

6. The computer-implemented method according to claim 5, wherein evaluating the cost of moving weights from p to q further comprises:

if the matrix element $C_{i,j}$ corresponding the smallest of said two smallest values is equal to zero, evaluating a first amount of transfer from a corresponding bin i of p to a corresponding bin j of q, as allowed under the relaxed constraint and the complementary constraint applied; and then, evaluating a second amount of transfer from p to q corresponding to a second smallest value of said two smallest values, as allowed under the complementary constraint.

7. The computer-implemented method according to claim 1, wherein the quantity $\Sigma_{i,j} F_{i,j} \cdot C_{i,j}$ is minimized under a relaxed flow constraint applied for all of the pairs {i,j}.

8. The computer-implemented method according to claim 7, wherein computing said distance further comprises:

for each pair {i,j}, sorting columns or rows of C in an ascending order, whereby columns of C are sorted for each i if the relaxed flow constraint applied is $F_{i,j} \leq q_j$, or rows of C are sorted for each j if the relaxed constraint applied is $F_{i,j} \leq p_i$, and evaluating a cost of moving weights from p to q, as allowed under the relaxed constraint and the complementary constraint applied, and according to the sorted columns or rows of C.

9. The computer-implemented method according to claim 8, wherein computing said distance further comprises:

where the relaxed flow constraint is $F_{i,j} \leq q_j$, sorting, for each 1, the i-th row $C_{i,[1 \ldots n_q]}$ of C to create a list $s_p$ such that $C_{i,s_p[l]} \leq C_{i,s_p[l+1]}$ for $l \in \{1, \ldots, n_q-1\}$, where $C_{i,s_p[l]}$ denotes the l-th smallest distance between bin i of p and bins $s_p[l]$ of q, and where the relaxed constraint is $F_{i,j} \leq p_i$, sorting, for each j, the j-th column $C_{[1 \ldots n_p],j}$ of C to create a list $s_q$ such that $C_{s_q[l],j} \leq C_{s_q[l+1],j}$ for $l \in \{1, \ldots, n_p-1\}$, where $C_{s_q[l],j}$ denotes the l-th smallest distance between bin j of q and bins $s_q[l]$ in p.

10. The computer-implemented method according to claim 9, wherein evaluating the cost of moving weights from p to q is performed as an iterative process, whereby $F_{i,j}$ elements are iteratively evaluated based on the relaxed flow constraint and the complementary flow constraint, and contributions of $F_{i,j}$ elements to a cumulative transportation cost are evaluated by multiplying $F_{i,j}$ elements with $C_{i,s_{p|q}[l]}$ elements obtained from said lists $s_p$ and $s_q$.

11. The computer-implemented method according to claim 10, wherein said iterative process is interrupted upon completing an iteration thereof, before having evaluated the cost of moving all weights from p to q, and the evaluation of the cost of moving remaining weights from p to q is resumed based on an algorithm that differs from said iterative process in complexity.

12. The computer-implemented method according to claim 11, wherein the evaluation is resumed based on a relaxed word mover's distance method.

13. The computer-implemented method according to claim 10, wherein said iterative process is terminated upon completing a single iteration.

14. The computer-implemented method according to claim 10, wherein said method is implemented as a method having a linear average time complexity.

15. The computer-implemented method according to claim 14, wherein said method has three phases, each having a linear average time complexity, whereby the method further comprises, given a query histogram q and a parameter k determining a number of iterations to be performed in said iterative process:

during a first phase, and for each vector in a vocabulary V of vectors of histograms p of a database of histograms, determining top-k closest vectors in q;

during a second phase, for each histogram p of the database, obtaining matrix elements $F_{i,s_i[l]}$ indicating how much weight of a bin i of p has to flow to a bin $s_i[l]$ of q to move p into q, where $s_i[l]$ corresponds to the l-th closest vector in q to a vector of bin i of p, by minimizing the quantity $\Sigma_{i,l} F_{i,s_i[l]} \cdot C_{i,s_i[l]}$ under both the relaxed flow constraint and the complementary flow constraint, wherein the summation $\Sigma i,l$ is performed for l varying from 1 to k−1, such that k−1 iterations of said iterative process are performed; and during a third phase, obtaining matrix elements $F_{i,s_i[k]}$ indicating how remaining weights of p have to flow to a k-th closest vector in q, without imposing the relaxed flow constraint.

16. The computer-implemented method according to claim 15, wherein determining the top-k closest vectors in q comprises:

performing a dense matrix-matrix multiplication between a v×m matrix V and a transpose of a h×m matrix Q to obtain a v×h distance matrix D, where V stores information from the vocabulary V, m is a dimension of the vectors in V, v is a size of V, and Q stores information from the query histogram q of size h;

performing a row-wise reduction, whereby the top-k closest vectors are computed in each row of D and stored on a v×k matrix Z, whereas indices of q that are associated with the top-k closest vectors computed are stored on a v×k matrix S; and constructing a v×k matrix W matrix storing corresponding weights of q, wherein $W_{i,l}=q_{s_i[l]}$ for i=1, . . . , v and l=1, . . . , k, during the second phase, the matrices Z and W are used to transport a largest possible weight of p, this transportation being, by virtue of W, constrained to a smallest possible cost as given by Z, the database histograms are iteratively split into matrices $X^{(l)}$ and $Y^{(l)}$ based on W, where $Y^{(l)}$ indicates weights transported from the database histograms p to the query histogram q at iteration l, and $X^{(l)}$ indicates weights remaining in the database histograms after l iterations, whereby a cost of transporting $Y^{(l)}$ to a histogram q is computed as $Y^{(l)} \cdot z^{(l)}$, where is the l-th column of Z, and during the third phase and upon completion of k−1 iterations, a cost of transporting remaining weights from p to q is determined by multiplying $k^{(k-1)}$ by $z^{(k)}$.

17. The computer-implemented method according to claim 1, wherein each matrix element $C_{i,j}$ is computed on-the-fly, upon minimizing said quantity $\Sigma_{i,j} F_{i,j} \cdot C_{i,j}$.

18. The computer-implemented method according to claim 1, wherein a computation of said distance between pairs of histograms is distributed across a cluster of graphics processing units.

19. A computer program product comprising a non-transitory computer readable storage medium embodying program instructions executable by one or more processors to perform:

querying features of a digital object as respective vectors;

deriving a queried histogram q based on the respective vectors;

assessing distances between pairs of histograms comprising the queried histogram q and one of a plurality of histograms p stored in a histogram database assessing distances between pairs of histograms, wherein each of the histograms is a representation of a digital object and said representation comprises bins associating weights to respective vectors, the latter representing respective features of said digital object;

for each pair {p, q} of histograms p and q of said pairs of histograms, to compute a distance between p and q of said each pair {p, q}, comprising:

computing said distance using linear algebra primitives of a first library according to a cost of moving p into q, so as to obtain a flow matrix F, whose matrix elements $F_{i,j}$ indicate, for each pair {i,j} of bins of p and q, how much weight of a bin i of p has to flow to a bin j of q to move p into q, by minimizing a quantity $\Sigma_{i,j} F_{i,j} \cdot C_{i,j}$, where $C_{i,j}$ is a matrix element of a cost matrix C representing said cost, and minimizing, using linear algebra primitives of a second library said quantity $\Sigma_{i,j} F_{i,j} \cdot C_{i,j}$ under two flow constraints, these including a relaxed flow constraint $F_{i,j} \leq r_{i,j}$ and a complementary flow constraint, wherein the relaxed flow constraint $F_{i,j} \leq r_{i,j}$ is applied for at least some of the pairs {i,j}, with $r_{i,j}$ equal to $p_i$ or $q_j$, where $p_i$ and $q_j$ are weights associated to bins i and j of p and q, respectively, and the complementary flow constraint is either an out-flow constraint $\Sigma^j F_{i,j}=p_i$ if $r_{i,j}=q_j$ or an in-flow constraint $\Sigma_i F_{i,j}=q_j$ if $r_{i,j}=p_i$; and wherein the first and second libraries comprise linear algebra primitives of general-purpose computing on one or more graphics processing units.

* * * * *